US008090598B2

(12) United States Patent
Bauer et al.

(10) Patent No.: US 8,090,598 B2
(45) Date of Patent: Jan. 3, 2012

(54) MONITORING SYSTEM FOR DETERMINING AND COMMUNICATING A COST OF INSURANCE

(75) Inventors: Alan Rex Bauer, Mill Valley, CA (US); Kurtis Tavis Burns, Lakewood, OH (US); Michael Vincent Esposito, Aurora, OH (US); David Charles Huber, Jr., Hudson, OH (US); Patrick Lawrence O'Malley, Avon, OH (US)

(73) Assignee: Progressive Casualty Insurance Company, Mayfield Village, OH (US)

( * ) Notice: Subject to any disclaimer, the term of this patent is extended or adjusted under 35 U.S.C. 154(b) by 2257 days.

(21) Appl. No.: 10/764,076

(22) Filed: Jan. 23, 2004

(65) Prior Publication Data
US 2004/0153362 A1    Aug. 5, 2004

Related U.S. Application Data

(63) Continuation-in-part of application No. 09/571,650, filed on May 15, 2000, now Pat. No. 6,868,386, which is a continuation-in-part of application No. 09/135,034, filed on Aug. 17, 1998, now Pat. No. 6,064,970, which is a continuation of application No. 08/592,958, filed on Jan. 29, 1996, now Pat. No. 5,797,134.

(51) Int. Cl.
*G06Q 40/00* (2006.01)
(52) U.S. Cl. ................. 705/4; 701/1; 701/117
(58) Field of Classification Search .......... 702/188, 702/2, 3; 701/29, 1, 5, 117; 705/400
See application file for complete search history.

(56) References Cited

U.S. PATENT DOCUMENTS
3,388,404 A    6/1968  Bush
(Continued)

FOREIGN PATENT DOCUMENTS
CA    2151458    6/1994
(Continued)

OTHER PUBLICATIONS http://www.obd-onboarddiagnostics.com/AutoWatch.htm, OBD Vehicle Usage Monitor-Autowatch, "AutoWatch™", Copyright 1999-2004-Software for Cars.

(Continued)

*Primary Examiner* — Lena Najarian
*Assistant Examiner* — Teresa Woods
(74) *Attorney, Agent, or Firm* — Brinks Hofer Gilson & Lione

(57) ABSTRACT

Means are provided for recording, storing, calculating, communicating and reviewing one or more operational aspects of a machine. Insurance costs are based, in part, on activities of the machine operator. A discount may be provided in exchange for recording the operational aspects and providing the recorded information to the insurer. The party may review information and decide whether to provide it to the insurer. The means for reviewing may present comparative information. Information that causes insurance costs to vary may be highlighted. Provided data may be used to verify insurance application information, generate actuarial information or determine insurance rates. Operating data may be reviewed on a computer, a Web site or other display medium so a party can observe how his operating behavior compares to that of other operators of similar machines and may be manipulated so a party can understand how changes in operating behavior can affect his insurance rates.

78 Claims, 18 Drawing Sheets

U.S. PATENT DOCUMENTS

| | | |
|---|---|---|
| 3,504,337 A | 3/1970 | Ekman |
| 3,716,679 A | 2/1973 | Graesslin et al. |
| 3,781,824 A | 12/1973 | Caiati et al. |
| 3,792,445 A | 2/1974 | Bucks et al. |
| 3,870,894 A | 3/1975 | Brede et al. |
| 3,938,092 A | 2/1976 | Callahan |
| 4,013,875 A | 3/1977 | McGlynn |
| 4,067,061 A | 1/1978 | Juhasz |
| 4,072,850 A | 2/1978 | McGlynn |
| 4,212,195 A | 7/1980 | Young |
| 4,234,926 A | 11/1980 | Wallace et al. |
| 4,258,421 A | 3/1981 | Juhasz et al. |
| 4,258,430 A | 3/1981 | Tyburski |
| 4,271,402 A | 6/1981 | Kastura et al. |
| 4,387,587 A | 6/1983 | Faulconer |
| 4,395,624 A | 7/1983 | Wartski |
| 4,533,962 A | 8/1985 | Decker et al. |
| 4,581,708 A | 4/1986 | Van Ostrand et al. |
| 4,593,357 A | 6/1986 | Van Ostrand et al. |
| 4,608,638 A | 8/1986 | Tsikos |
| 4,638,289 A | 1/1987 | Zottnik |
| 4,638,295 A | 1/1987 | Middlebrook et al. |
| 4,667,336 A | 5/1987 | Best |
| 4,671,111 A | 6/1987 | Lemelson |
| 4,685,061 A | 8/1987 | Whitaker |
| 4,692,882 A | 9/1987 | Skovgaard et al. |
| 4,706,083 A | 11/1987 | Baatz et al. |
| 4,745,564 A | 5/1988 | Tennes et al. |
| 4,763,745 A | 8/1988 | Eto et al. |
| 4,807,179 A | 2/1989 | Clere et al. |
| 4,829,434 A | 5/1989 | Karmel et al. |
| 4,831,526 A | 5/1989 | Luchs et al. |
| 4,836,024 A | 6/1989 | Woehrl et al. |
| 4,843,463 A | 6/1989 | Michetti |
| 4,843,578 A | 6/1989 | Wade |
| 4,845,630 A | 7/1989 | Stephens |
| 4,853,720 A | 8/1989 | Onari et al. |
| 4,926,331 A | 5/1990 | Windle et al. |
| 4,939,652 A | 7/1990 | Steiner |
| 4,944,401 A | 7/1990 | Groenewegen |
| 4,945,759 A | 8/1990 | Krofchalk et al. |
| 4,987,541 A | 1/1991 | Levente et al. |
| 4,992,943 A | 2/1991 | McCracken |
| 5,017,916 A | 5/1991 | Londt et al. |
| 5,046,007 A | 9/1991 | McCrery et al. |
| 5,055,851 A | 10/1991 | Sheffer |
| 5,074,144 A | 12/1991 | Krofchalk et al. |
| 5,111,289 A | 5/1992 | Lucas et al. |
| 5,189,621 A | 2/1993 | Onari et al. |
| 5,223,844 A | 6/1993 | Mansell et al. |
| 5,249,127 A | 9/1993 | Komatsu |
| 5,303,163 A | 4/1994 | Ebaugh et al. |
| 5,319,374 A | 6/1994 | Desai et al. |
| 5,325,082 A | 6/1994 | Rodriguez |
| 5,355,855 A | 10/1994 | Saikalis |
| 5,359,528 A | 10/1994 | Haendel et al. |
| 5,365,451 A | 11/1994 | Wang et al. |
| 5,373,346 A | 12/1994 | Hocker |
| 5,379,219 A | 1/1995 | Ishibashi |
| 5,394,136 A | 2/1995 | Lammers |
| 5,400,018 A | 3/1995 | Scholl et al. |
| 5,412,570 A | 5/1995 | Gruler et al. |
| 5,430,432 A | 7/1995 | Camhi et al. |
| 5,442,553 A | 8/1995 | Parrillo |
| 5,445,347 A | 8/1995 | Ng |
| 5,446,659 A | 8/1995 | Yamawaki |
| 5,459,660 A | 10/1995 | Berra |
| 5,463,567 A | 10/1995 | Boen et al. |
| 5,465,079 A | 11/1995 | Bouchard et al. |
| 5,471,193 A | 11/1995 | Peterson et al. |
| 5,485,161 A | 1/1996 | Vaughn |
| 5,497,329 A | 3/1996 | Tang |
| 5,499,182 A | 3/1996 | Ousborne |
| 5,500,806 A | 3/1996 | Bellin et al. |
| 5,546,305 A | 8/1996 | Kondo |
| 5,548,273 A | 8/1996 | Nicol et al. |
| 5,550,551 A | 8/1996 | Alesio |
| 5,550,738 A | 8/1996 | Bailey et al. |
| 5,570,087 A | 10/1996 | Lemelson |
| 5,581,464 A | 12/1996 | Woll et al. |
| 5,608,629 A | 3/1997 | Cuddihy et al. |
| 5,638,273 A | 6/1997 | Coiner et al. |
| 5,654,501 A | 8/1997 | Grizzle et al. |
| 5,680,140 A | 10/1997 | Loomis |
| 5,693,876 A | 12/1997 | Ghitea, Jr. et al. |
| 5,694,116 A | 12/1997 | Kojima |
| 5,694,322 A | 12/1997 | Westerlage et al. |
| 5,726,893 A | 3/1998 | Schuchman et al. |
| 5,732,074 A | 3/1998 | Spaur et al. |
| 5,737,711 A | 4/1998 | Abe |
| 5,758,299 A | 5/1998 | Sandborg et al. |
| 5,758,300 A | 5/1998 | Abe |
| 5,790,427 A | 8/1998 | Greer et al. |
| 5,797,134 A | 8/1998 | McMillan et al. |
| 5,799,249 A | 8/1998 | Kennedy, III et al. |
| 5,805,079 A | 9/1998 | Lemelson |
| 5,811,884 A | 9/1998 | Matuoka et al. |
| 5,815,070 A | 9/1998 | Yoshikawa |
| 5,815,071 A | 9/1998 | Doyle |
| 5,815,093 A | 9/1998 | Kikinis |
| 5,819,198 A | 10/1998 | Peretz |
| 5,832,394 A | 11/1998 | Wortham |
| 5,844,473 A | 12/1998 | Kaman |
| 5,845,256 A | 12/1998 | Pescitelli et al. |
| 5,862,500 A | 1/1999 | Goodwin |
| 5,877,707 A | 3/1999 | Kowalick |
| 5,884,202 A | 3/1999 | Arjomand |
| 5,916,287 A | 6/1999 | Arjomand et al. |
| 5,919,239 A | 7/1999 | Fraker et al. |
| 5,928,291 A | 7/1999 | Jenkins et al. |
| 5,956,691 A | 9/1999 | Powers |
| 5,974,356 A | 10/1999 | Doyle et al. |
| 6,009,363 A | 12/1999 | Beckert et al. |
| 6,064,299 A | 5/2000 | Lesesky et al. |
| 6,064,970 A | 5/2000 | McMillan et al. |
| 6,067,488 A | 5/2000 | Tano |
| 6,073,063 A | 6/2000 | Leong Ong et al. |
| 6,076,026 A | 6/2000 | Jambhekar et al. |
| 6,088,636 A | 7/2000 | Chigumira et al. |
| 6,141,611 A | 10/2000 | Mackey et al. |
| 6,167,333 A | 12/2000 | Gehlot |
| 6,169,943 B1 | 1/2001 | Simon et al. |
| 6,181,994 B1 | 1/2001 | Colson et al. |
| 6,185,490 B1 | 2/2001 | Ferguson |
| 6,189,057 B1 | 2/2001 | Schwanz et al. |
| 6,204,757 B1 | 3/2001 | Evans et al. |
| 6,225,898 B1 | 5/2001 | Kamiya et al. |
| 6,240,773 B1 | 6/2001 | Rita et al. |
| 6,246,933 B1 | 6/2001 | Bague |
| 6,246,934 B1 | 6/2001 | Otake et al. |
| 6,253,129 B1 | 6/2001 | Jenkins et al. |
| 6,263,268 B1 | 7/2001 | Nathanson |
| 6,278,936 B1 | 8/2001 | Jones |
| 6,295,492 B1 | 9/2001 | Lang et al. |
| 6,298,290 B1 | 10/2001 | Abe et al. |
| 6,317,668 B1 | 11/2001 | Thibault |
| 6,356,823 B1 | 3/2002 | Iannotti et al. |
| 6,360,145 B1 | 3/2002 | Robinson |
| 6,366,207 B1 | 4/2002 | Murphy |
| 6,366,848 B1 | 4/2002 | Gustavsson |
| 6,392,564 B1 | 5/2002 | Mackey et al. |
| 6,393,346 B1 | 5/2002 | Keith et al. |
| 6,405,112 B1 | 6/2002 | Rayner |
| 6,411,203 B1 | 6/2002 | Lesesky et al. |
| 6,421,791 B1 | 7/2002 | Cocco et al. |
| 6,430,488 B1 | 8/2002 | Goldman et al. |
| 6,438,472 B1 | 8/2002 | Tano et al. |
| 6,459,969 B1 | 10/2002 | Bates et al. |
| 6,470,240 B1 | 10/2002 | Haynes et al. |
| 6,499,114 B1 | 12/2002 | Almstead et al. |
| 6,502,020 B2 | 12/2002 | Lang |
| 6,502,035 B2 | 12/2002 | Levine |
| 6,505,106 B1 | 1/2003 | Lawrence et al. |
| 6,526,341 B1 | 2/2003 | Bird et al. |
| 6,529,723 B1 | 3/2003 | Bentley |
| 6,556,899 B1 | 4/2003 | Harvey et al. |
| 6,556,905 B1 | 4/2003 | Mittelsteadt et al. |

| | | | |
|---|---|---|---|
| 6,604,033 B1 | 8/2003 | Banet et al. | |
| 6,608,554 B2 | 8/2003 | Lesesky et al. | |
| 6,611,740 B2 | 8/2003 | Lowrey et al. | |
| 6,618,668 B1 | 9/2003 | Laird | |
| 6,622,070 B1 | 9/2003 | Wacker et al. | |
| 6,622,083 B1 | 9/2003 | Knockeart et al. | |
| 6,629,029 B1 | 9/2003 | Giles | |
| 6,636,149 B2 | 10/2003 | Moon | |
| 6,636,790 B1 | 10/2003 | Lightner et al. | |
| 6,640,188 B2 | 10/2003 | Hashida | |
| 6,663,191 B2 | 12/2003 | Sakata et al. | |
| 6,694,245 B2 | 2/2004 | Minami et al. | |
| 6,701,234 B1 | 3/2004 | Vogelsang | |
| 6,714,859 B2 | 3/2004 | Jones | |
| 6,714,894 B1 * | 3/2004 | Tobey et al. | 702/188 |
| 6,732,031 B1 | 5/2004 | Lightner et al. | |
| 6,741,927 B2 | 5/2004 | Jones | |
| 6,744,352 B2 | 6/2004 | Lesesky et al. | |
| 6,745,151 B2 | 6/2004 | Marko et al. | |
| 6,771,176 B2 | 8/2004 | Wilkerson | |
| 6,788,207 B2 | 9/2004 | Wilkerson | |
| 6,804,606 B2 | 10/2004 | Jones | |
| 6,807,469 B2 | 10/2004 | Funkhouser et al. | |
| 6,823,258 B2 | 11/2004 | Ukai et al. | |
| 6,832,141 B2 | 12/2004 | Skeen et al. | |
| 6,879,962 B1 | 4/2005 | Smith et al. | |
| 6,904,359 B2 | 6/2005 | Jones | |
| 6,931,309 B2 | 8/2005 | Phelan et al. | |
| 6,952,645 B1 | 10/2005 | Jones | |
| 6,957,133 B1 | 10/2005 | Hunt et al. | |
| 7,015,800 B2 | 3/2006 | Lesesky et al. | |
| 7,030,781 B2 | 4/2006 | Jones | |
| 7,191,058 B2 | 3/2007 | Laird et al. | |
| 7,228,211 B1 | 6/2007 | Lowrey et al. | |
| 7,449,993 B2 | 11/2008 | Lesesky et al. | |
| 7,536,457 B2 | 5/2009 | Miller | |
| 2001/0044733 A1 | 11/2001 | Lee et al. | |
| 2002/0059156 A1 | 5/2002 | Hwang et al. | |
| 2002/0070851 A1 | 6/2002 | Raichle et al. | |
| 2002/0111725 A1 | 8/2002 | Burge | |
| 2002/0133273 A1 | 9/2002 | Lowrey et al. | |
| 2002/0133275 A1 | 9/2002 | Thibault | |
| 2002/0143447 A1 | 10/2002 | Miller | |
| 2002/0150050 A1 | 10/2002 | Nathanson | |
| 2002/0169529 A1 | 11/2002 | Kim | |
| 2002/0173885 A1 | 11/2002 | Lowrey et al. | |
| 2003/0009270 A1 | 1/2003 | Breed | |
| 2003/0023568 A1 | 1/2003 | Perotti et al. | |
| 2003/0050747 A1 | 3/2003 | Kamiya | |
| 2003/0163664 A1 | 8/2003 | Kanda | |
| 2003/0167345 A1 | 9/2003 | Knight et al. | |
| 2003/0182033 A1 | 9/2003 | Underdahl et al. | |
| 2003/0204290 A1 | 10/2003 | Sadler et al. | |
| 2004/0138790 A1 | 7/2004 | Kapolka et al. | |
| 2004/0139034 A1 * | 7/2004 | Farmer | 705/400 |
| 2004/0167689 A1 | 8/2004 | Bromley et al. | |
| 2005/0096809 A1 | 5/2005 | Skeen et al. | |
| 2005/0131597 A1 | 6/2005 | Raz et al. | |
| 2005/0137757 A1 | 6/2005 | Phelan et al. | |
| 2006/0053038 A1 | 3/2006 | Warren et al. | |
| 2006/0253307 A1 | 11/2006 | Warren et al. | |
| 2007/0027726 A1 | 2/2007 | Warren et al. | |

FOREIGN PATENT DOCUMENTS

| | | |
|---|---|---|
| CA | 2164608 | 12/1994 |
| CA | 2229238 | 8/1999 |
| DE | 195 22 940 A1 | 1/1997 |
| DE | 197 28 872 A | 1/1999 |
| EP | 0 383 593 A2 | 8/1990 |
| EP | 0 444 738 A2 | 9/1991 |
| EP | 0 629 978 A1 | 12/1994 |
| EP | 0 700 009 | 3/1996 |
| EP | 0 700 009 A3 | 3/1996 |
| EP | 0 895 173 A3 | 2/1999 |
| EP | 935208 | 11/1999 |
| EP | 1 128 265 A1 | 8/2001 |
| EP | 1 160 707 A1 | 12/2001 |
| EP | 1 164 551 A2 | 12/2001 |
| EP | 1 207 499 A1 | 5/2002 |
| EP | 1 241 599 A1 | 9/2002 |
| EP | 1 746 537 A3 | 1/2007 |
| FR | 2 533 049 | 3/1984 |
| GB | 2 143 978 | 2/1985 |
| GB | 2 225 461 | 5/1990 |
| JP | 3-4660 A | 1/1991 |
| JP | 4-182868 | 6/1992 |
| JP | 05104985 A | 4/1993 |
| JP | 6-4733 | 1/1994 |
| JP | 6-259632 | 9/1994 |
| JP | 7-159192 | 6/1995 |
| JP | 2000 335450 A | 12/2000 |
| NL | C1016618 | 11/2000 |
| WO | WO 84/03359 A1 | 8/1984 |
| WO | WO 88/09023 A1 | 11/1988 |
| WO | 90/02388 | 3/1990 |
| WO | WO 93/10510 A1 | 5/1993 |
| WO | WO 93/21583 | 10/1993 |
| WO | WO 94/04975 A1 | 3/1994 |
| WO | WO 94/18645 A1 | 8/1994 |
| WO | WO 94/28434 A1 | 12/1994 |
| WO | WO 96/15636 A1 | 5/1996 |
| WO | WO 97/13208 | 4/1997 |
| WO | WO 97/27561 | 7/1997 |
| WO | WO 97/33382 A1 | 9/1997 |
| WO | WO 98/47109 A1 | 10/1998 |
| WO | WO 00/17721 A2 | 3/2000 |
| WO | WO 00/17800 A1 | 3/2000 |
| WO | WO 0052616 | 9/2000 |
| WO | WO 00/79727 A2 | 12/2000 |
| WO | WO 01/18491 A1 | 3/2001 |
| WO | WO 01/26338 A2 | 4/2001 |
| WO | WO 01/55690 A1 | 8/2001 |
| WO | WO 01/73693 A2 | 10/2001 |
| WO | WO 01/86576 A1 | 11/2001 |
| WO | WO 02/41119 A2 | 5/2002 |
| WO | WO 03/073339 A1 | 9/2003 |
| WO | WO 2006028484 | 3/2006 |

OTHER PUBLICATIONS http://www.roadsafety.com/shop/, Road Safety "Safe Driving Starts with a Well Trained Driver", 1999-2003 Road Safety International, Inc.

http://www.smart-driver.com/index.html, SmartDriver.

DriveRight® Spec Sheet, CarChip & CarChipE/X, OBDII-Based Vehicle Data Logger and Software 8210 and 8220, DS8210 Rev B, Nov. 5, 2003.

Ease Diagnostics Catalog, 16 pgs., Catalog 2000-B, Copyright 1999-2000 Ease Simulation Inc.

Ease Diagnostics Product Catalog, 20 pgs., Copyright 1999 Ease Simulation Inc.

AutoWatch product description, 2 pages, 1998, Copyright 1998 Ease Diagnostic.

News Release, Auto Watch™ (New Product Announcement), 3 pages, Jun. 16, 1998.

Ease Simulation, Inc., Invoice, # 9813, 1 page, dated Oct. 2, 1998.

WKGM/TV 6, check for payment to Ease Simulation, Inc. of Invoice #9813, 1 page, Nov. 13, 1998.

Final Report—Vehicle Data Collection, 1 page, Jul. 2000.

Ease Diagnostics E-mail from Stephen Golenski regarding Auto Watch Fleet photo, 1 page, Apr. 12, 2006.

Ease Diagnostics E-mail regarding Auto Watch photo, 2 pages, Apr. 12, 2006.

Ease Diagnostics, 37pages, 1999-2003.

Earle Eldridge, If your teen puts pedal to the metal, new gadget will tattle, USA Today Money, 2 pages, Section B, Aug. 24, 1998.

Ease Simulation, Inc., website as found at: http://web.archive.org.web/19981205184219/http://www.easesim.com, accessed Apr. 7, 2006.

Ease Simulation, Inc., Invoice with Visa receipt payment, 2 pages, Oct. 14, 1998.

San Jose International Auto Show Advertisement, San Jose Convention Center, 2 pages, Jan. 6-10, 1999, Advertisement.

AutoWatch™, Ease Diagnostics, copyright 2000-03, 2 pages.

Ease Diagnostics News Release titled Ease Diagnostics New Product Announcement: Ease OBD I/OBD II Data Logger, Jun. 22, 1999, 2 pages.

Users Manual for the AutoWatch™/ AutoWatch™ Fleet OBD II Version, Rev 050902, Ease Simulation, Inc., copyright 1998-2002, pp. 1-71.

AutoWatch—It's There When You're Not: Requirements, Ease Simulation, Inc., copyright 1997-2003, Revised Mar. 3, 2003, printed from the internet at <http://www.obd2.com/autowatch/obd2/autowatch_requirements.htm> on Sep. 9, 2004, 2 pages.

Chidester, A. et al., "Recording Automotive Crash Event Data," International Symposium on Transportation Recorders, May 1999, Arlington, Virginia, printed from the internet at <http://64.233.179.104/search?q=cache:5Nz6R6g5eMsJ:www.nhtsa.dot.gov/cars/problems/st...> on Sep. 8, 2004, 14 pages.

Gilman, D., "Re: DERM—Automotive Black Boxes -," The Traffic Accident Reconstruction Origin ARnews, Jun. 8, 1999, printed from the internet at <http://www.tarorigin/ARnews9-98/0612.html> on Sep. 8, 2004, 2 pages.

Menchu, J., "Choosing the Right Scan Tool," MOTOR, Jul. 2002, pp. 26-27, 30-31, 35-36, and 38.

Mitcham, A., "Evaluation of Currently Available OBD Equipment: Report on OBD Hand-Held Scan Tool Technology," U.S. Environmental Protection Agency 16th Mobile Sources/Clean Air Conference, Sep. 22, 2000, 18 pages.

Mitcham, A., "On-Board Diagnostic Hand-Held Scan Tool Technology: Adherence to the Society of Automotive Engineers Requirements for Scan Tools and an Evaluation of Overall Scan Tool Capability," U.S. Environmental Protection Agency, Oct. 2000, 27 pages.

Murray, C. J., "PC's next stop: Your dashboard," Design News, May 18, 1998, printed from the internet at <http://www.designnews.com/index.asp?layout=articlePrint&articleID=CA117026> on Sep. 8, 2004, 3 pages.

Pathfinder 2001 Mega Release!, [298-1 (Jan. 1975)], SPX Service Solutions, 6 pages.

Society for Automotive Engineers Report titled "Surface Vehicle Recommended Practice: OBD II Scan Tool—Equivalent to ISO/DIS 15031-4: Dec. 14, 2001," SAE J1978, Issued Mar. 1992, Revised Apr. 2002, Society of Automotive Engineers, Inc., copyright 2002, pp. 1-16.

Society for Automotive Engineers Report titled "Surface Vehicle Recommended Practice: Universal Interface for OBD II Scan," SAE J2201, Issued Jun. 1993, Society of Automotive Engineers, Inc., copyright 1993, pp. 1-45.

Society for Automotive Engineers Report titled "Surface Vehicle Recommended Practice: Universal Interface for OBD II Scan," SAE J2201, Issued Jun. 1993, Superseding J2201 Jun. 1993, Society of Automotive Engineers, Inc., copyright 1999, pp. 1-44.

Society for Automotive Engineers Report titled "Surface Vehicle Standard: (R) E/E Diagnostics Test Modes—Equivalent to ISO/DIS 15031-5:Apr. 30, 2002," SAE J1979, Issued Dec. 1991, Revised Apr. 2002, Society of Automotive Engineers, Inc., copyright 2002,159 pages.

Vetronix Corporation—Crash Data Retrieval System Frequently Asked Questions, Vetronix Corporation, copyright 2004, printed from the internet at <http://www.vetronix.com/diagnostics/cdr/faqs.html> on Sep. 8, 2004, 5 pages.

Vetronix Corporation Press Release article titled "Vetronix Corporation launches the Crash Data Retrieval (CDR) System," Mar. 9, 2000, printed from the internet at <http://www.vetronix.com/company/press/vtx_2000-03-09_cdr.html> on Sep. 8, 2004, 2 pages.

Vetronix Corporation Press Release article titled "Vetronix Corporation to Provide 'AutoConnect' Vehicle Interface Solutions for the Clarion AutoPC," Jan. 8, 1998, 1 page.

Vetronix Corporation Presentation "Advances in Scan Tool Technology," from OBD 2K On-Board Diagnostics Conference 2000, Ogden, UT, May 19, 2000, 13 pages.

Vetronix Corporation Presentation titled "Vetronix Crash Data Retrieval System," from IEEE P1616 Meeting, Sep. 24, 2002, 29 pages.

"The Safest Cars of 91", Baig, Edward U.S. News & World Report v109, n22, p. 71;Dec. 3, 1990.

"Vendor's Spice Up Services", Robert Deierlein, BeverageWorld, v109, n1467, p. 82; Jun. 1990.

Kaneko, Tetsuya; Jovanis, Paul P. Multiday driving patterns and motor carrier accident risk. A disaggregate analysis. Accident Analysis and Prevention, vol. 24, No. 5, pp. 437-456, Jan. 1, 1992.

Rosenberg, Martin; Alexander, Shephen A., Rate Classification Reform in New Jersey. Best's Review (Prop/Casualty) vo. 92. No. 12, pp. 30-32. Apr. 1992.

Jan. 1, 1994 UK: "An Interest in Black Magic—Motor Technology", Insurance Age, p. 25.

"The Road Watches You", The New York Times, May 3, 1995, Wednesday, Late Edition—Final, p. 23.

Pasher, Auto Web site takes off, Mar. 1998, National Underwater (Property & Casualty/Risk & Benefits Management), vol. 102 No. 11, pp. 9 and 16.

Festa, For Insurance Sales, Turn to the 'Web', Aug. 1995, Insurance Regulator, vol. 5, No. 31, p. 1.

Business Editors, Electric Insurance Joins Intuit's Quicken InsureMarket Offering Online Auto Policies in 6 States, Dec. 1998, Business Wire.

National General Assurance Company Maryland Rule Manual Private Passenger Auto New Business Effective Jun. 16, 2006 Renewals Effective Sep. 29, 2006.

Gordon, Jacques. "—this Year and Beyond: OBD III is Just Speculation, but OBD II Keeps Evolving in Response to Real-World Experience." *Aftermarket Business* v112, n3, p. 52. Mar. 2002: ISSN: ISSN: 0892-1121, pp. 5.

"Sensors". *Automotive Engineering International* v107, n9, p. 37. Sep. 1999, pp. 14.

Paul Berk. "Riding with Customers: for Automakers, Getting Internet Services into Cars Can Build Closer Client Relationships. (Telematics)." *Internet World*, v7, n20, p. 44(1). Dec. 2002: ISSN: 1097-8291, pp. 4.

Davis DriveRight. "Solutions for Vehicle Safety and Management 2005." <www.driveright.cc>; pp. 16.

"Safemotion". "Welcome to Safemotion" <http://www.safemotion.net/>; last visited on Feb. 9, 2005, pp. 2.

Davis DriveRight Need Help Choosing Davisnet.com. <http://web.archive.org/web/20010603073125/www.davisnet.com/drive/help_choosing.asp>; last visited on Nov. 4, 2004, p. 1.

Davis DriveRight Overview Davisnet.com. <http://web.archive.org/web/20010518135302/http://www.davisnet.com/drive/>; last visited on Nov. 4, 2004, p. 1.

Evangelista, Benny. "Car-crash recorders / 'Black boxes' are moving from airliners to autos" *San Francisco Chronicle*. Sep. 2, 2002. Sfgate.com<http://www.sfgate.com/cgi-bin/article.cgi?f=/c/a/2002/09/02/BU167062.DTL>; last visited on Oct. 25, 2004, pp. 6.

"Road Safety Teen Drivers Frequently Asked Questions" Roadsafety.com <http://64.233.167.104/search?q=cache:bwGvLSZMlr0J:www.roadsafety.com/faqs_teen.php+drivers +teen+...>; last visited on Oct. 25, 2004, pp. 7.

"Road Safety Press Releases" Roadsafety.com <http://www.roadsafety.com/pressreleases.php?view=16&id=18>; last visited on Oct. 25, 2004, p. 1.

"Road Safety Press Releases" Roadsafety.com <http://www.roadsafety.com/pressreleases.php?view=16&id=19>; last visited on Oct. 25, 2004, p. 1.

"Newsmine.org—black box in car reports you.txt" Newmine.org. <http://newsmine.org/archive/security/bigbrother/black-box-in-car-reports-you.txt>; last visited on Oct. 25, 2004, p. 4.

"NHTSAR Research and Development, NRD-01. EDR- NHTSA Event Data Recorder Program". *NHTSA Event Data Recorder Program* <http://www-nrd.nhtsa.dot.gov/departments/nrd-01/summaries/EDR.html>; last visited on Oct. 25, 2004, pp. 2.

"Vetronix ETAS Group." Vetronix Corporation—Crash Data Retrieval System Frequently Asked Questions. *Crash Data Retrieval System Frequently Asked Questions*. <http://www.vetronix.com/diagnostics/cdr/faqs.html>; last visited on Oct. 25, 2004, pp. 5.

"Mechanical Forensics Engineering Services, LLC (MFES). Mechanical Forensics: Vetronix CDR system"—*Vetronix Crash Data Retrieval System* <http://mfes.com/cdr.html>; last visited on Oct. 25, 2004, pp. 8.

AutoTap OBDII Diagnostic Scanner—*AutoTap Product Information*;<http://www.autotap.com/products.html>; last visted on Oct. 25, 2004, pp. 2.

Carley, Larry. "Understanding OBDII: Past, Present & Future"© 2001; <http://hostingprod.com/@aa 1car.com/library/us7960bd.htm>; last visited on Oct. 25, 2004, pp. 6.

Barkai, Joseph. "Vehicle Diagnostics—Are you Ready for the Challenge?" Society of Automotive Engineers, Inc. © 2001; pp. 5.

RoadSafety International. "Road Safety On-Board Computer Systems" <http://web.archieve.org/web/20000309144948/http://www.roadsafety.com/>; last visited on Nov. 12, 2004, pp. 2.

Event Data Recorder Applications for Highway and Traffic Safety: *Patents* 21 http://www-nrd.nhtsa.dot.gov/edr-site/patents.html> last visited on Nov. 12, 2004, pp. 11.

Richgels, Jeff. "Free Car Insurance; State Is Test For New Volkswagen Incentive". *The Capital Times*(Madison, Wisconsin). <http://www6.lexisnexis.com/publisher/EndUser?Action=UserDisplayFullDocument&orgid...>; last visited on Jan. 6, 2005, pp. 3.

Creative Innovators Associates, LLC. "Creative Innovators Associates". *CIA Intellectual Property Portfolio*. <http://www.cia123.com/cia_portfolio.htm>; last visited on Feb. 7, 2005, pp. 3.

"Automatic Vehicle Location for Public Safety Dispatch," Trimble brochure, 1993, 8 pages.

Brown, Robert L., "Recent Canadian Human Rights Decisions Having an Impact on Gender-Based Risk Classification Systems," Journal of Actuarial Practice, vol. 3, No. 1, 1995, pp. 171-192.

Butler, P. et al., "Driver Record: a Political Red Herring That Reveals the Basic Flaw in Automobile Insurance Pricing," Journal of Insurance Regulation, vol. 8, No. 2, 1989, pp. 200-234.

Butler, P., "Cost-Based Pricing of Individual Automobile Risk Transfer: Car-Mile Exposure Unit Analysis," Journal of Actuarial Practice, vol. 1, No. 1, 1993, pp. 51-84.

Butler, P., "Gas-Tax and Time-Period Insurance Methods Equally Flawed," National Underwriter, Jun. 15, 1998, p. 594.

Butler, T., "Insurance by the Mile," Letter to the Editor, The Washington Post, Jan. 17, 1991, 2 pages.

Capon, R., "Insure by the Mile," Letter to the Editor, The Washington Post, Dec. 27, 1990, 2 pages.

Civil Docket for Case No. 1:10-cv-01370-PAG, *Progressive Casualty Insurance Company* versus *Safeco Insurance Company of Illinois et al.*, U.S. District Court, Northern District of Ohio (Cleveland) printed from the internet at <http://ecf.ohnd.uscourts.gov/cgi-bin/DktRpt.pl?324688388186026-L_1_0-1> on Dec. 22, 2010, 12 pages.

Complaint, filed Jun. 18, 2010, Case No. 1:10-cv-01370-PAG: *Progressive Casualty Insurance Company* versus *Safeco Insurance Company of Illinois, Safeco Insurance Company of America, Safeco Corporation, Liberty Mutual Insurance Company, Liberty Mutual Group Inc., The Ohio Casualty Insurance Company, and Open Seas Solutions, Inc.*, 201 pages.

Defendants' Motion to Dismiss for Failure to State a Claim Upon Which Relief May Be Granted, filed Sep. 8, 2010, Case No. 1:10-cv-01370-PAG: *Progressive Casualty Insurance Company* versus *Safeco Insurance Company of Illinois, Safeco Insurance Company of America, Safeco Corporation, Liberty Mutual Insurance Company, Liberty Mutual Group Inc., The Ohio Casualty Insurance Company, and Open Seas Solutions, Inc.*, 99 pages.

Defendants' Motion to Stay Litigation Pending Ex Parte Reexamination of the Patent-In-Suit by the United States PTO filed Oct. 14, 2010, Case No. 1:10-cv-01370-PAG: *Progressive Casualty Insurance Company* versus *Safeco Insurance Company of Illinois, Safeco Insurance Company of America, Safeco Corporation, Liberty Mutual Insurance Company, Liberty Mutual Group Inc., The Ohio Casualty Insurance Company, and Open Seas Solutions, Inc.*, 339 pages.

Defendants' Reply Memorandum in Support of Their Motion to Dismiss for Failure to State a Claim Upon which Relief may be Granted filed Oct. 26, 2010, Case No. 1:10-cv-01370-PAG: *Progressive Casualty Insurance Company* versus *Safeco Insurance Company of Illinois, Safeco Insurance Company of America, Safeco Corporation, Liberty Mutual Insurance Company, Liberty Mutual Group Inc., The Ohio Casualty Insurance Company, and Open Seas Solutions, Inc.*, 13 pages.

Defendants' Reply Memorandum in Support of Their Motion to Stay Litigation Pending Ex Parte Reexamination of the Patent-In-Suit by the United States PTO filed Nov. 4, 2010, Case No. 1:10-cv-01370-PAG: *Progressive Casualty Insurance Company* versus *SafeCo Insurance Company of Illinois, SafeCo Insurance Company of America, SafeCo Corporation, Liberty Mutual Insurance Company, Liberty Mutual Group Inc., The Ohio Casualty Insurance Company, and Open Seas Solutions, Inc.*, 12 pages.

Dorweiler, P., "Notes on Exposure and Premium Bases," Proceedings of the Casualty Actuarial Society, vol. 16, Nos. 33 & 34, 1929-1930, pp. 319-343.

Hanneghan et al., "The World-Wide Web as a Platform for Supporting Interactive Concurrent Engineering," Proceedings of Advanced Information Systems Engineering—8th International Conference, CAiSE'96, Heraklion, Crete, Greece, May 20-24, 1996, 17 pages. (available from the internet at URL: http://www.cms.livjm.ac.uk/cmsmhann/publications/papers/CAISE96.pdf).

Klein, J. S. et al., "A Black Box Tells Just the Facts," The Los Angeles Times, Section:View, Jun. 13, 1991, pp. E-8. (2 pages).

Memorandum of Opinion and Order (regarding Defendants' Motion to Dismiss for Failure to State a Claim Upon Which Relief May Be Granted) dated Nov. 12, 2010, Case No. 1:10-cv-01370-PAG: *Progressive Casualty Insurance Co.* versus *Safeco Insurance Co., et al.*, 10 pages.

Memorandum of Opinion and Order (regarding Defendants' Motion to Stay Litigation Pending Ex Parte Reexamination of the Patent-In-Suit by the United States PTO) dated Nov. 12, 2010, Case No. 1:10-cv-01370-PAG: *Progressive Casualty Insurance Co.* versus *Safeco Insurance Co., et al.*, 9 pages.

Narten, T., "File Server," Encyclopedia of Computer Science, Ed. Anthony Ralston and Edwin D. Reilly, 3rd. Ed., New York: Van Nostrand Reinhold, copyright 1993, pp. 554-555.

"Operation of an Audited-Mile/Year Automobile Insurance System—Under Pennsylvania Law," A Study Prepared for Sponsors of Pennsylvania Senate Bill SB 775 and Pennsylvania House Bill 1881 and other Interested Members of the Pennsylvania General Assembly, NOW Insurance Project for National Organization for Women, Jun. 1992, 18 pages.

Progressive's Memorandum in Opposition to Defendants' Motion to Dismiss for Failure to State a Claim Upon which Relief may be Granted filed Oct. 12, 2010, Case No. 1:10-cv-01370-PAG: *Progressive Casualty Insurance Company* versus *Safeco Insurance Company of Illinois, Safeco Insurance Company of America, Safeco Corporation, Liberty Mutual Insurance Company, Liberty Mutual Group Inc., The Ohio Casualty Insurance Company, and Open Seas Solutions, Inc.*, 59 pages.

Progressive's Memorandum in Opposition to Defendants' Motion to Stay Litigation Pending Ex Parte Reexamination of the Patent-In-Suit by the USPTO filed Oct. 28, 2010, Case No. 1:10-cv-01370-PAG: *Progressive Casualty Insurance Company* versus *Safeco Insurance Company of Illinois, Safeco Insurance Company of America, Safeco Corporation, Liberty Mutual Insurance Company, Liberty Mutual Group Inc., The Ohio Casualty Insurance Company, and Open Seas Solutions, Inc.*, 80 pages.

PSC-200™ Intelligent Data Controller, product description, Trimble, 1994, 2 pages.

Request for Ex Parte Reexamination of U.S. Patent. No. 6,064,970 Pursuant to 35 U.S.C. § 302, 37 C.F.R. § 1.510, filed Sep. 22, 2010, 178 pages.

"Vehicle Alert and Notification System," IBM Technical Disclosure Bulletin, vol. 38, No. 8, Aug. 1995, pp. 209-211.

\* cited by examiner

| Usage | You | Average |
|---|---|---|
| Estimated Annual Mileage | 11,326 | 12,031 |
| Daytime miles | 7,365 | 9,165 |
| Night time miles | 2,589 | 1,734 |
| High Risk miles | 1,372 | 1,132 |
| Average trip time | 00:36:12 | 00:32:47 |
| Average trip miles | 14.6 | 19.4 |
| Estimated annual trips | 4,587 | 5,578 |

| Date | Time | Description |
|---|---|---|
| 11/07/2003 | 4:57PM | Cleared |
| 11/07/2003 | 5:09PM | Trip Logger connected to vehicle |
| 11/07/2003 | 7:40PM | Trip Logger disconnected from vehicle |
| 11/07/2003 | 8:06PM | Data downloaded from Trip Logger |
| 11/07/2003 | 8:45PM | Data downloaded from Trip Logger |
| 11/08/2003 | 2:57PM | Data downloaded from Trip Logger |
| 11/08/2003 | 3:01PM | Trip Logger connected to vehicle |
| 11/08/2003 | 4:52PM | Trip Logger disconnected from vehicle |
| 11/09/2003 | 11:21AM | Data downloaded from Trip Logger |
| 11/09/2003 | 11:23AM | Data downloaded from Trip Logger |
| 11/09/2003 | 11:24AM | Data downloaded from Trip Logger |
| 11/09/2003 | 11:30AM | Data downloaded from Trip Logger |
| 11/09/2003 | 11:32AM | Trip Logger connected to vehicle |
| 11/09/2003 | 11:35AM | Trip Logger disconnected from vehicle |
| 11/10/2003 | 12:06PM | Data downloaded from Trip Logger |
| 11/10/2003 | 7:58AM | Data downloaded from Trip Logger |
| 11/10/2003 | 1:12PM | Data downloaded from Trip Logger |
| 11/10/2003 | 1:40PM | Data downloaded from Trip Logger |

Upload date: November 10, 2003
Report: Speed

Below is a list of all of your Trip Logger chip activity; including when it was plugged into your car, when it was unplugged, when data was downloaded from the chip and when the chip was cleared.

Participation Requirements
FAQs
Contact Us

Interactive discount calculator
Find out if you are a safe driver
Safety and savings tips for your teen driver See how your driving compares to others:

more info.

MONITORING SYSTEM FOR DETERMINING AND COMMUNICATING A COST OF INSURANCE

This application is a continuation-in-part application of U.S. Ser. No. 09/571,650 filed May 15, 2000 now U.S. Pat. No. 6,868,386, which is a continuation-in-part of U.S. Ser. No. 09/135,034, filed Aug. 17, 1998, now U.S. Pat. No. 6,064, 970, which is a continuation of U.S. Ser. No. 08/592,958, filed Jan. 29, 1996, now U.S. Pat. No. 5,797,134. A related application is U.S. Ser. No. 09/364,803 filed Jul. 30, 1999.

FIELD OF THE INVENTION

The present invention relates to data acquisition, processing and communicating systems, and particularly to a system for acquiring and processing relevant data for an insured unit of risk, such as a vehicle or other machine, for purposes of providing a more accurate determination of the cost of insurance for the unit of risk and for communicating or quoting the so determined cost to an owner of the unit of risk. Although the invention has its principal applicability to motor vehicles such as automobiles, the invention is equally applicable to other units of risk such as, without limitation, factory machines, farm machines, motorcycles, motor homes, trucks, tractors, vans, buses, boats and other water craft and aircraft. The invention especially relates to a system for monitoring and communicating operational characteristics and operator actions relating to a unit of risk, to obtain increased amounts of data relating to the safety or risk of use of a subject unit, for purposes of providing a more accurate or customized determination of the cost of insurance corresponding to the usage of the risk unit, and for making such data and computed costs accessible to a non-customer, customer or insured or others on a personal computer, in hardcopy, over the Internet or by other electronic means for convenient communication. The invention relates to electronic commerce, particularly where insurance and related information is marketed, sold or communicated via the telephone, Internet or other interactive network.

BACKGROUND OF THE INVENTION

Conventional methods for determining costs of motor vehicle insurance involve gathering relevant historical data from a personal interview with, or a written application completed by, the applicant for the insurance and by referencing the applicant's public motor vehicle driving record that is maintained by a governmental agency, such as a Bureau of Motor Vehicles. Such data results in a classification of the applicant to a broad actuarial class for which insurance rates are assigned based upon the empirical experience of the insurer. Many factors are deemed relevant to such classification in a particular actuarial class or risk level, such as age, sex, marital status, location of residence and driving record.

The current system of insurance creates groupings of vehicles and drivers (actuarial classes) based on the following types of classifications.

| | |
|---|---|
| Vehicle: | Age;<br>manufacturer, model; and<br>value. |
| Driver: | Age;<br>sex;<br>marital status; |

-continued

| | |
|---|---|
| | driving record (based on government reports),<br>violations (citations);<br>at fault accidents; and<br>place of residence. |
| Coverage: | Types of losses covered,<br>liability,<br>uninsured or underinsured motorist,<br>comprehensive, and<br>collision;<br>liability limits; and<br>deductibles. |

The classifications, such as age, are further broken into actuarial classes, such as 21 to 24, to develop a unique vehicle insurance cost based on the specific combination of attributes for a particular risk. For example, the following information would produce a unique vehicle insurance cost:

| | | |
|---|---|---|
| Vehicle: | Age | 1997 (seven years old) |
| | manufacturer, model | Ford, Explorer XLT |
| | value | $ 18,000 |
| Driver: | Age | 38 years old |
| | sex | male |
| | marital status | single |
| | driving record (based on government reports) | |
| | violations | 1 point (speeding) |
| | at fault accidents | 3 points (one at fault accident) |
| | place of residence | 33619 (zip code) |
| Coverage: | Types of losses covered | |
| | liability | yes |
| | uninsured or underinsured motorist | no |
| | comprehensive | yes |
| | collision | yes |
| | liability limits | $100,000/$300,000/$50,000 |
| | deductibles | $500/$500 |

A change to any of this information might result in a different premium being charged, if the change resulted in a different actuarial class or risk level for that variable. For instance, a change in the drivers' age from 38 to 39 may not result in a different actuarial class, because 38 and 39 year old people may be in the same actuarial class. However, a change in driver age from 38 to 45 may result in a different premium because the records of the insurer indicate a difference in risk associated with those ages and, therefore, the age difference results in a change in actuarial class or assigned risk level.

Current insurance rating systems also provide discounts and surcharges for some types of use of the vehicle, equipment on the vehicle and type of driver. Common surcharges and discounts include:

| | |
|---|---|
| Surcharges: | Business use. |
| Discounts: | Safety equipment on the vehicle<br>airbags, and<br>antilock brakes;<br>theft control devices<br>passive systems (e.g. "The Club"), and<br>alarm system; and<br>driver type<br>good student, and<br>safe driver (accident free).<br>group<br>senior drivers<br>fleet drivers |

A principal problem with such conventional insurance determination systems is that much of the data gathered from the applicant in the interview or from the written application is not verifiable, and even existing public records contain only minimal information, much of which has little relevance towards an assessment of the likelihood of a claim subsequently occurring. In other words, current rating systems are primarily based on past realized losses and the past record of other drivers with similar characteristics. None of the data obtained through conventional systems necessarily reliably predicts the manner or safety of future operation of the vehicle by the driver/applicant. Accordingly, the limited amount of accumulated relevant data and its minimal evidential value towards computation of a fair cost of insurance has generated a long-felt need for an improved system for more reliably and accurately accumulating data having a highly relevant evidential value towards predicting the actual manner of a vehicle's future operation by a specific driver or group of drivers.

Many types of vehicle operating data recording systems have heretofore been suggested for purposes of obtaining an accurate record of certain elements of vehicle operation. Some are suggested for identifying the cause for an accident; others are for more accurately assessing the efficiency of operation and/or environmental emissions of a vehicle. Such systems disclose a variety of conventional techniques for recording vehicle operation data elements in a variety of data recording systems. It has even been suggested to detect and record seatbelt usage to assist in determination of the vehicle insurance costs (U.S. Pat. No. 4,667,336).

The various forms and types of vehicle operating data acquisition and recordal systems that have heretofore been suggested and employed have met with varying degrees of success for their express limited purposes. All possess substantial defects such that they have only limited economic and practical value for a system intended to provide an enhanced acquisition, recordal and/or communication system of data which would be both comprehensive and reliable in predicting an accurate and adequate cost of insurance for the vehicle. Since the type of operating information acquired and recorded in prior art systems was generally never intended to be used for determining the cost of vehicle insurance, the data elements that were monitored and recorded therein were not directly related to predetermined safety standards or the determining of an actuarial class or risk level for the vehicle operator. For example, recording data characteristics relevant to the vehicle's exhaust emissions may be completely unrelated to the safety of operation of the vehicle. Further, there is the problem of recording and subsequently compiling the relevant data for an accurate determination of an actuarial profile and an appropriate insurance cost therefor.

Current motor vehicle control and operating systems comprise electronic systems readily adaptable for modification to obtain the desired types of information relevant to determination of the cost of insurance. Vehicle tracking systems have been suggested which use communication links with satellite navigation systems for providing information describing a vehicle's location based upon navigation signals. When such positioning information is combined with maps or geographic information in an expert system, vehicle location is ascertainable. Mere vehicle location, though, will not provide data particularly relevant to safety of operation unless the data is combined with other relevant data in an expert system which is capable of assessing whether the roads being driven are high-risk or low-risk with regard to vehicle safety.

On-line Web sites for marketing and selling goods have become common place. Many insurers offer communication services to customers via Web sites relevant to an insured profile and account status. Commonly assigned pending application U.S. Ser. No. 09/135,034, filed Aug. 17, 1998, now U.S. Pat. No. 6,064,970, discloses one such system. Customer comfort with such Web site communication has generated the need for systems which can provide even more useful information to customers relative to a customer's contract with the insurer. Such enhanced communications can be particularly useful to an insured when the subject of the communications relates to cost determination, or when the subject relates to prospective reoccurring insurable events wherein the system can relate in the existing insured's profile with some insurer-provided estimates to the effect that a future event or method of operating a unit of risk would have on an estimated cost of insuring the unit of risk.

The present invention contemplates a new and improved monitoring, recording, processing and communicating system for an insured unit of risk, such as a machine, which primarily overcomes the problem of accurately determining cost of insurance based upon data which does not take into consideration how a specific unit of risk or machine is operated or decisions made by a particular unit of risk owner or operator. The subject invention will base insurance charges with regard to current material data representative of actual decisions made by the operator and/or operating characteristics to provide a more precise classification rating of an operator or the unit in an actuarial class which has a vastly reduced rating error over conventional insurance cost systems. Additionally, the present invention allows for frequent (e.g., monthly, quarterly, semiannually, etc.) adjustment to the cost of insurance because of the changes in operating behavior patterns. This can result in insurance charges that are readily controllable by individual operators. The system is adaptable to current electronic operating systems, tracking systems and communicating systems for the improved extraction of selected insurance related data. In addition, the system provides for enhanced and improved communication and analysis of the relevant acquired data, cost estimates of insuring events and customer insured profiles through a personal computer and/or Internet/Web site.

Another deficiency in prior art systems is that such systems were never intended to allow the operator to control whether to submit to the insurer the data elements monitored and recorded from the vehicle or machine. The system solves this problem by providing the means for the operator to control the submission of information to the insurer and by allowing the operator to understand how modifying operational behavior affects the cost of insurance.

BRIEF SUMMARY OF THE INVENTION

A system for monitoring, recording, storing and communicating operational characteristics and operator actions relating to a unit of risk in order to obtain data which reflects the level of safety or risk applicable to the operation of that unit of risk, for the purpose of obtaining a more accurate or customized determination of the cost of insuring that unit of risk, and for making such data and the resulting computed insurance costs accessible to a customer or insured, a non-customer or others on a personal computer, in hardcopy, over the Internet or by other electronic means for convenient review, comparison and analysis, such system being comprised of: 1) a data logger or other data recording device, 2) a means to transfer the data to a computer, if the operator so determines, 3) a means to compare the data to data obtained with respect to the operation of other similar machines or applicable risk factors, 4) a means to compute a resulting insurance cost and 5) a means to display and manipulate the data on a computer, Web site or other display medium to illustrate the effect of various operating characteristics and operator actions, and changes therein, on the cost of insurance.

BRIEF DESCRIPTION OF THE DRAWING

The invention may take form in various components and arrangements of components, and/or in various procedures and arrangements of procedures. The drawings are only for purposes of illustrating preferred embodiments. They are not to scale, and are not to be construed as limiting the invention.

FIG. 11 is display screen associated with a Web site displaying data received from the device for recording data regarding operational aspects of the motor vehicle in conjunction with information related to a cost of insurance and operational aspects of the operation of other motor vehicle and providing means for exploring how changing the operational aspects would affect a cost of insurance.

FIG. 12 is a display screen associated with the Web site displaying trip time information summarizing data received from the device for recording data regarding one or more operational aspects of the motor vehicle in conjunction with average trip time summary information associated with other vehicles.

Figure 13:
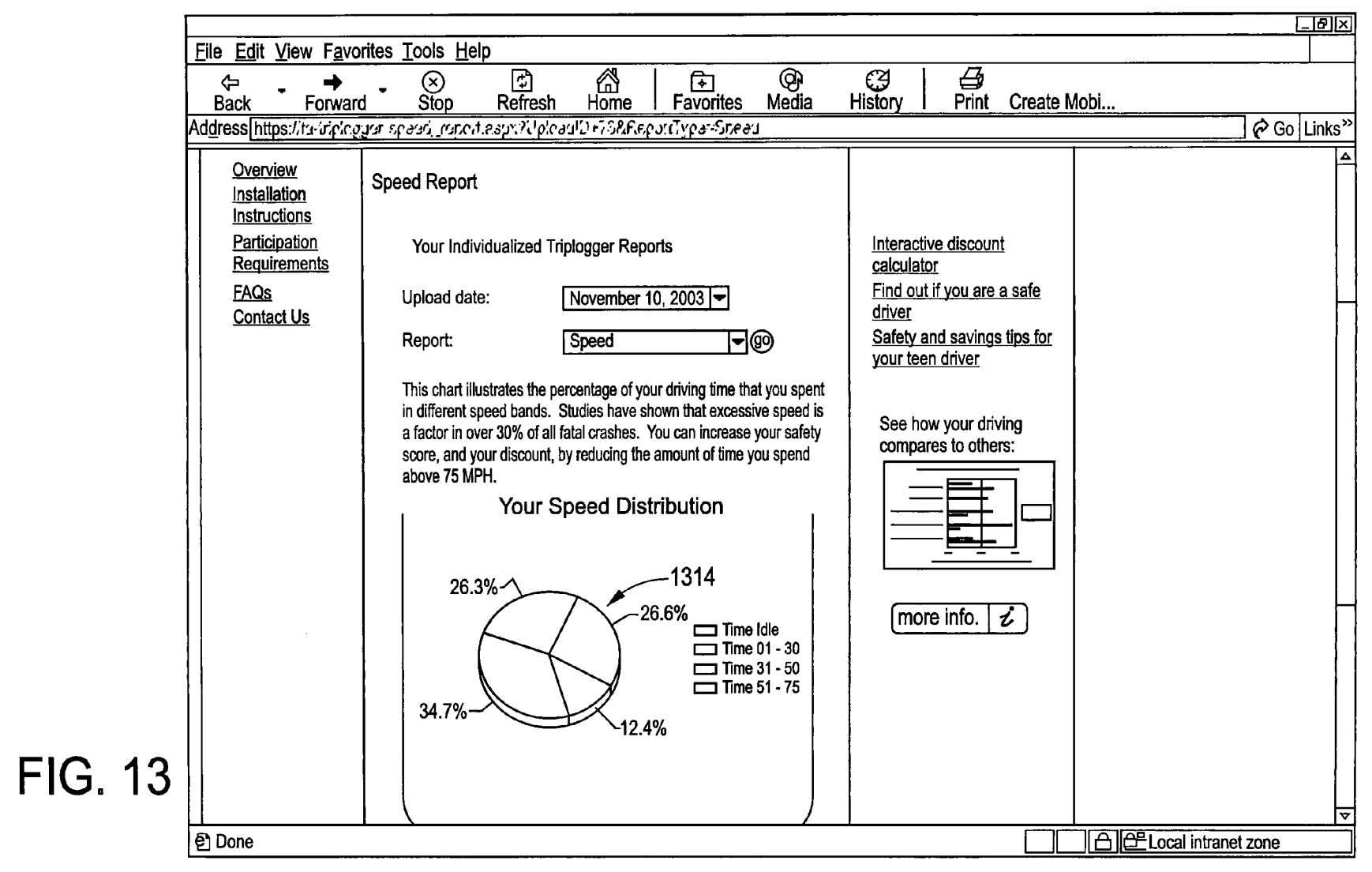

FIG. 13 is a display screen associated with the Web site displaying speed information summarizing data received from the device for recording data regarding one or more operational aspects of the motor vehicle.

Figure 14:
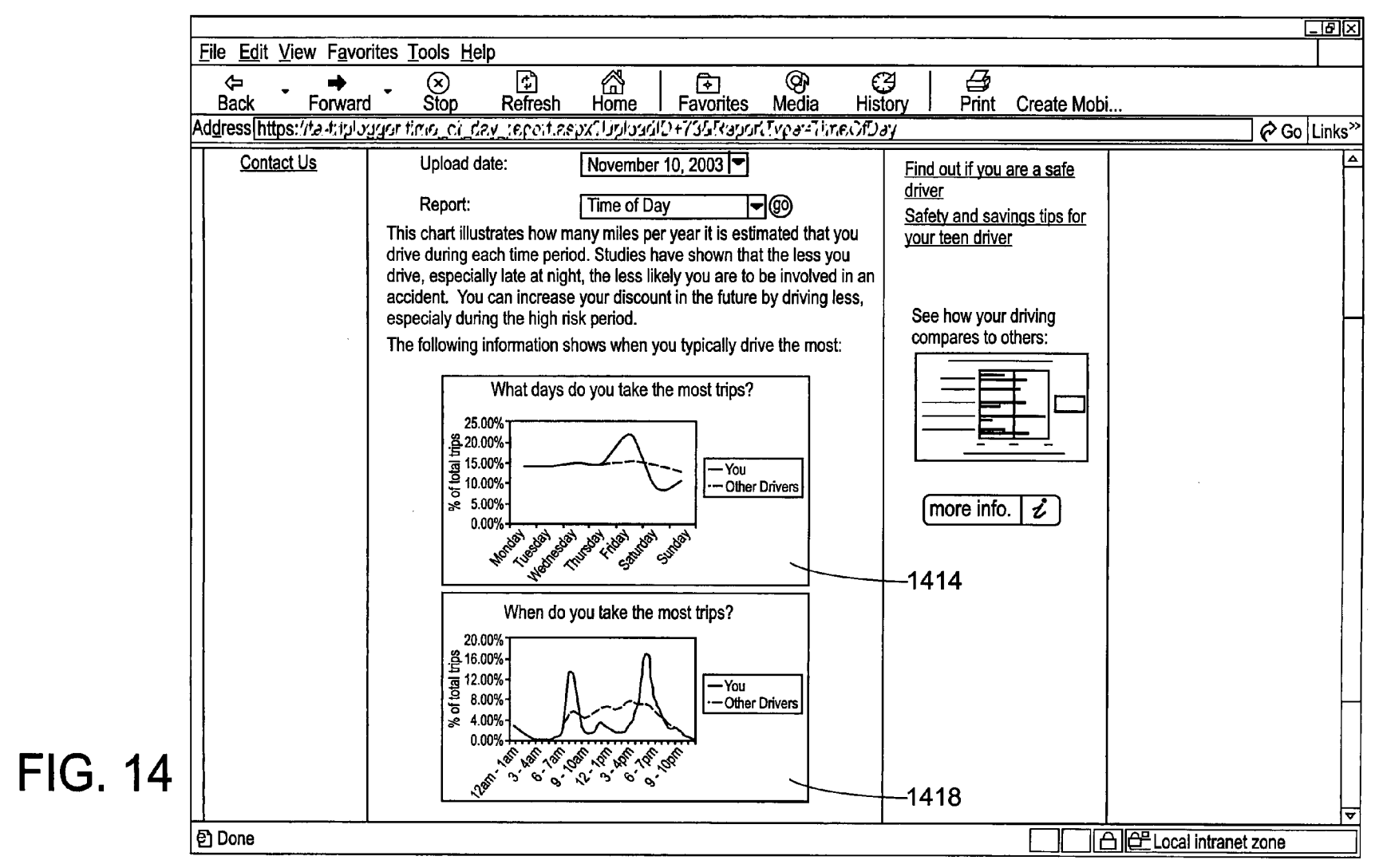

FIG. 14 is a display screen associated with a Web site displaying trip date information summarizing data received from the device for recording data regarding one or more operational aspects of the motor vehicle in conjunction with trip date summary information associated with other vehicles.

FIG. 17 is a display screen associated with a Web site displaying information summarizing installation, disconnection and data transfer events related to the use of the device for recording data regarding one or more operational aspects of the motor vehicle.

DETAILED DESCRIPTION OF THE PREFERRED EMBODIMENTS

Figure 1:
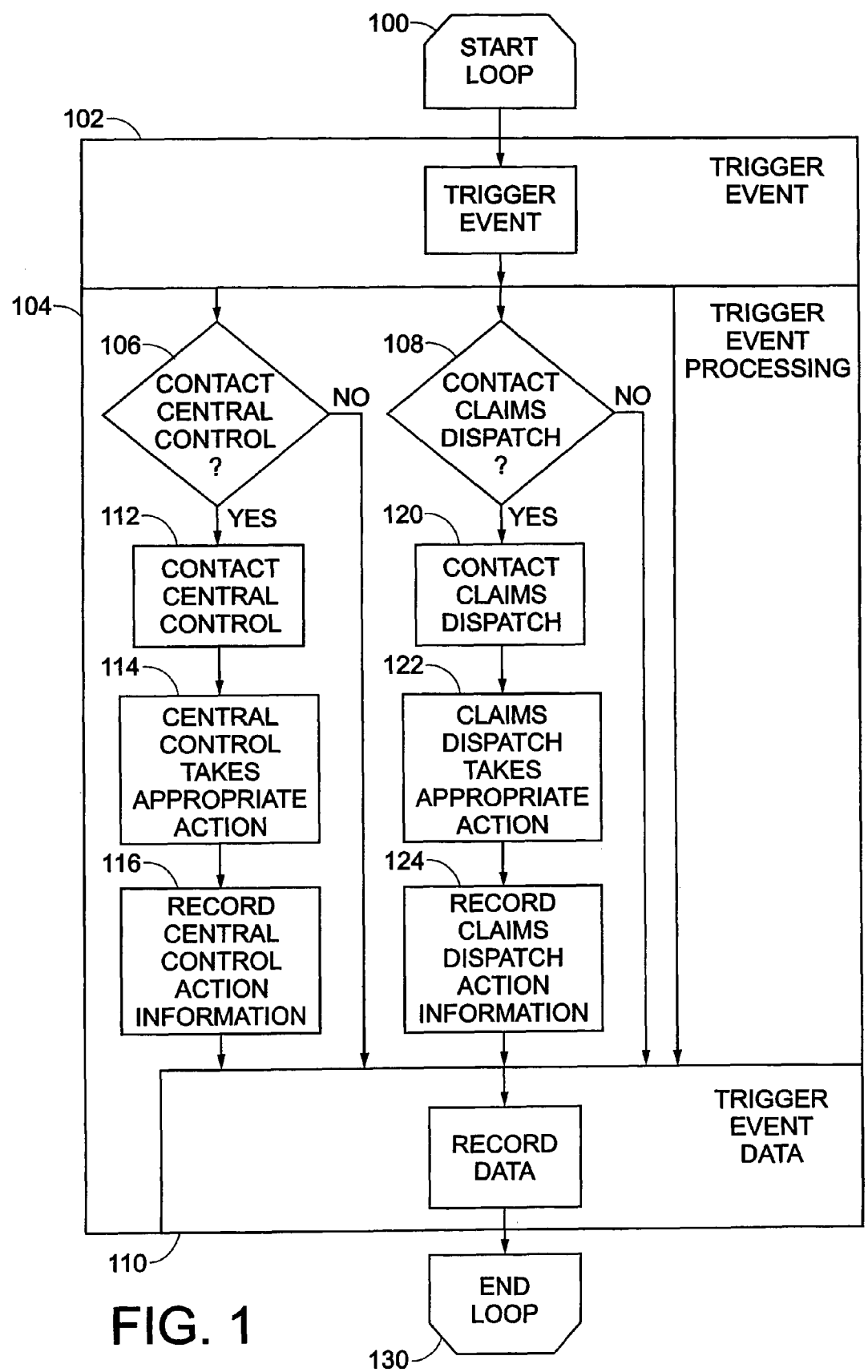
FIG. 1 is a block diagram/flowchart generally describing data capture methods within a unit of risk for insurance in claims processing.

The following terms and acronyms are used throughout the detailed description:

Internet. A collection of interconnected (public and/or private) networks that are linked together by a set of standard protocols (such as TCP/IP and HTTP) to form a global, distributed network. While this term is intended to refer to what is now commonly known as the Internet, it is also intended to encompass variations which may be made in the future, including changes and additions to existing standard protocols.

World Wide Web ("Web"). Used herein to refer generally to both (i) a distributed collection of interlined, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web Site. A computer system that serves informational content over a network using the standard protocols of the World Wide Web. Typically, a Web site corresponds to a particular Internet domain name, such as "progressive.com" and includes the content associated with a particular organization. As used herein, the term is generally intended to encompass both (i) the hardware/software server components that serve the informational content over the network, and (ii) the "back end" hardware/software components including any non-standard or specialized components, that interact with the server components to perform services for Web site users.

Referring now to the drawings, wherein the showings are for purposes of illustrating the preferred embodiments of the invention only and not for purposes of limiting same, the FIGURES show an apparatus and method for monitoring, recording and communicating insurance-related data for determination of an accurate cost of insurance based upon evidence relevant to the actual operation and location of a machine in particular, and the relative safety of that operation. Generally, a unit of risk, e.g., a vehicle or other machine, user or owner is charged for insurance based upon statistical averages related to the safety of operation based upon the insurer's experience with other users who drive similar vehicles in a similar geographic area or use similar machines.

Figure 3:
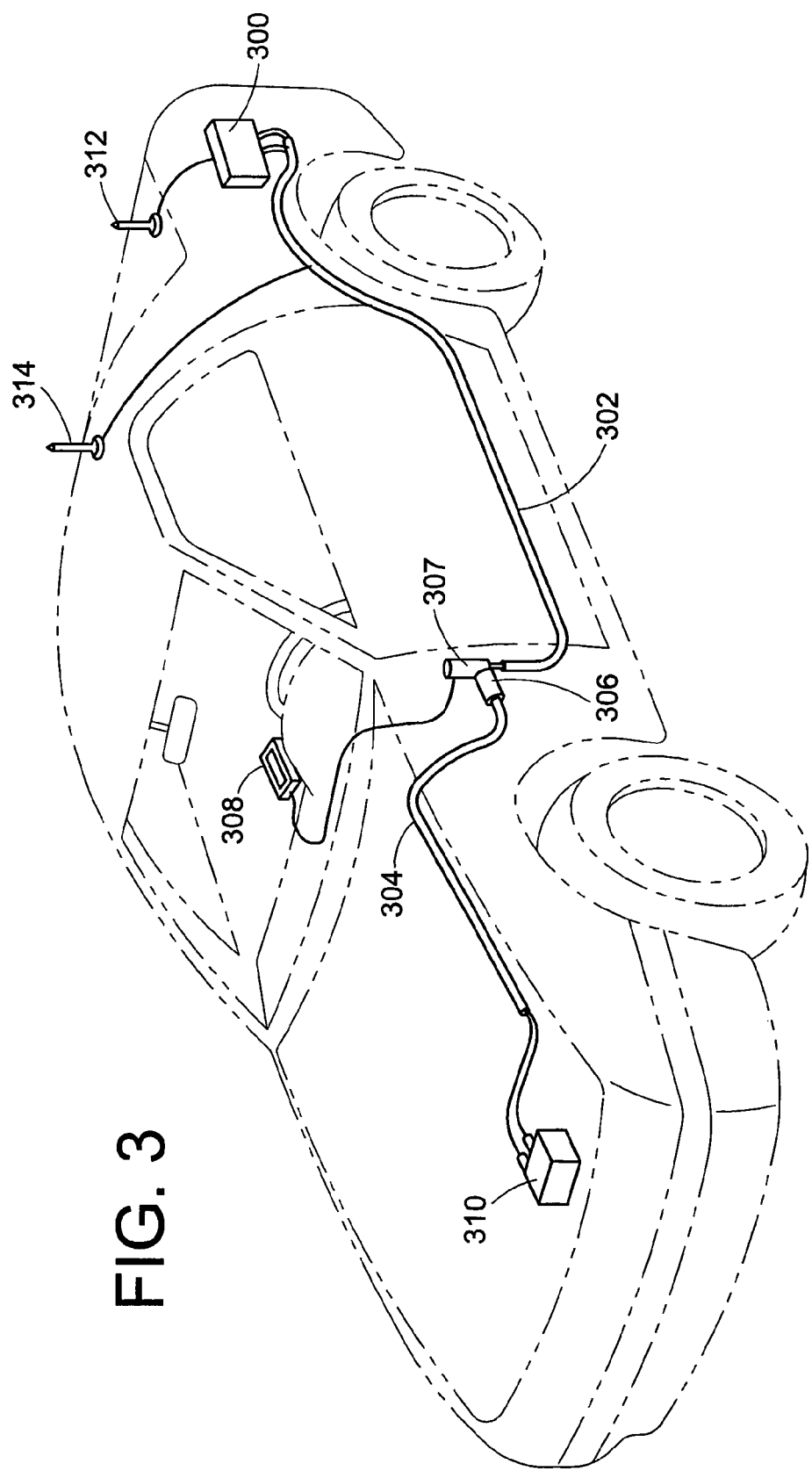
FIG. 3 is a suggestive perspective drawing of a vehicle including certain data elements monitoring, recording and communication devices.

For example, based on this information, the insurer makes assumptions about how and where the machine will be operated. The invention allows for the measure of the actual operational machine data while the machine is being operated. Where the machine is a vehicle, such data measurement will allow the vehicle user to directly control his/her insurance costs by operating the vehicle in a manner which he/she will know will evidence superior safety of operation and a minimal risk of generation of an insurance claim. Examples of data which can be monitored and recorded include:
1. Actual miles driven;
2. Types of roads driven on (high risk vs. low risk); and,
3. Safe operation of the vehicle by the vehicle user through:
    A. speeds driven,
    B. safety equipment used, such as seat belt and turn signals,
    C. time of day driven (high congestion vs. low congestion),
    D. rate of acceleration,
    E. rate of braking (deceleration),
    F. observation of traffic signs.
4. Driver identification With reference to FIG. 3, an exemplary motor vehicle is shown in which the necessary apparatus for implementing the subject invention is included. An on-board device 300 monitors and records various sensors and operator actions to acquire the desired data for determining an accurate cost of insurance. Although not shown therein, a plurality of operating sensors are associated with the motor vehicle to monitor a wide variety of raw data elements. Such data elements are communicated to the device 300 through a connections cable which is operatively connected to a vehicle data bus 304 through physical connector, such as, for example, an industry standard connector known as an SAE-1962 or On Board Diagnostic connector (e.g., ODBI, ODBII or in the near future ODBIII). Additionally, communications connections such as these may be made wirelessly, such as, for example, with the wireless technology currently known as Bluetooth® (The Bluetooth word mark and logos are owned by the Bluetooth SIG, Inc). A driver input device 308 may also be operatively connected to the device 300 through connector 307 and cable 302. The device 300 is powered through the car battery 310, a conventional generator system, a device battery or a solar based system (not shown). A device battery may be included in the device 300 even where main device power is drawn from the machine (motor vehicle). For instance, a device battery may provide power for a device clock, device memory and/or allow the device to record connection and disconnection events. Tracking of the vehicle for location identification can be implemented by the device 300 through navigation signals obtained from a GPS (global positioning system) antenna, a differential GPS or other locating system 312. The communications link to a central control station may be accomplished through the cellular telephone, radio, satellite or other wireless communication system 314. However, the wireless communications system 314 is not required.

Figure 4:
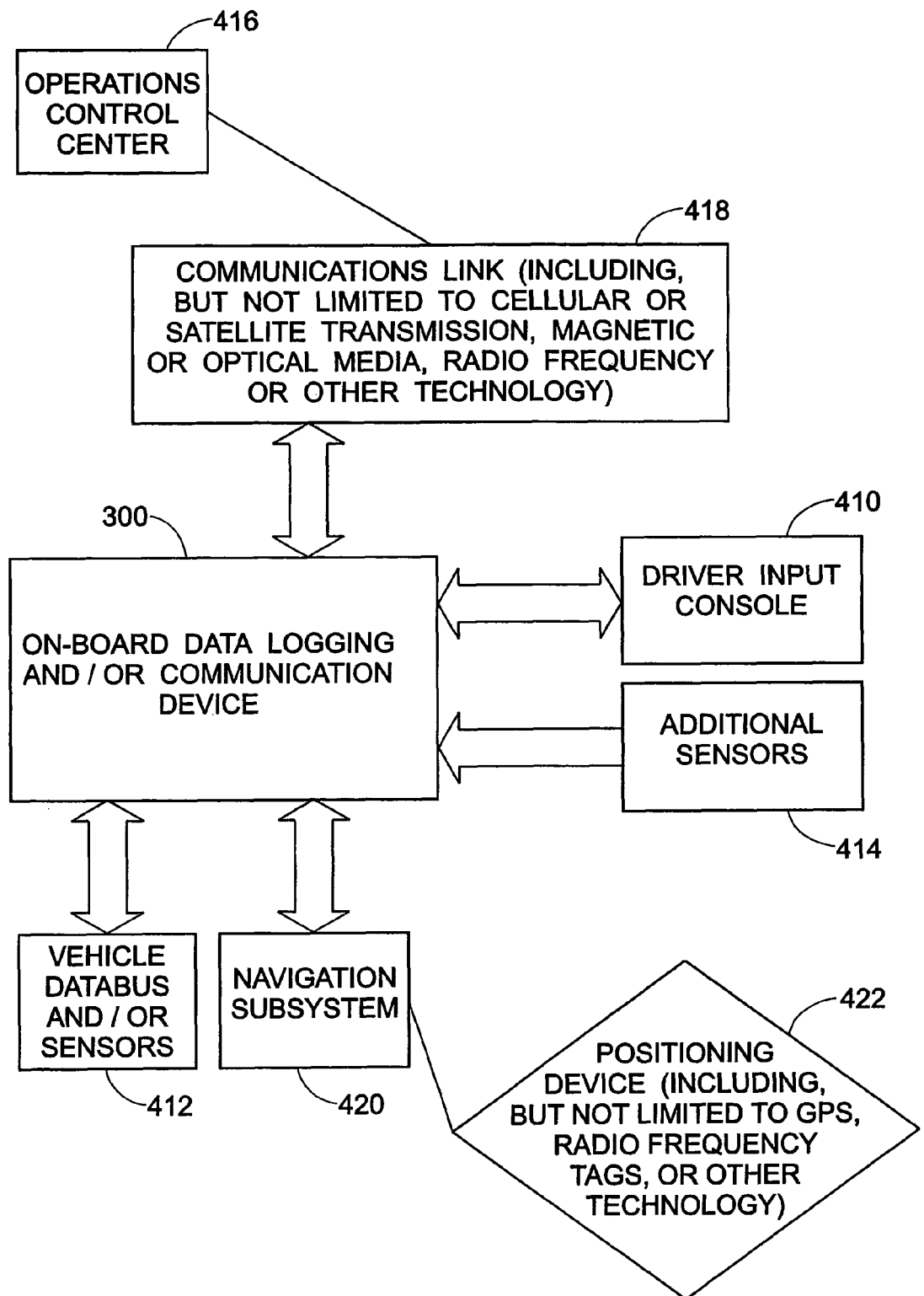
FIG. 4 is a block diagram of a vehicle onboard computer and recording system implementing the subject invention for selective communication with a central operations control center and a global positioning navigation system.
Figure 18:
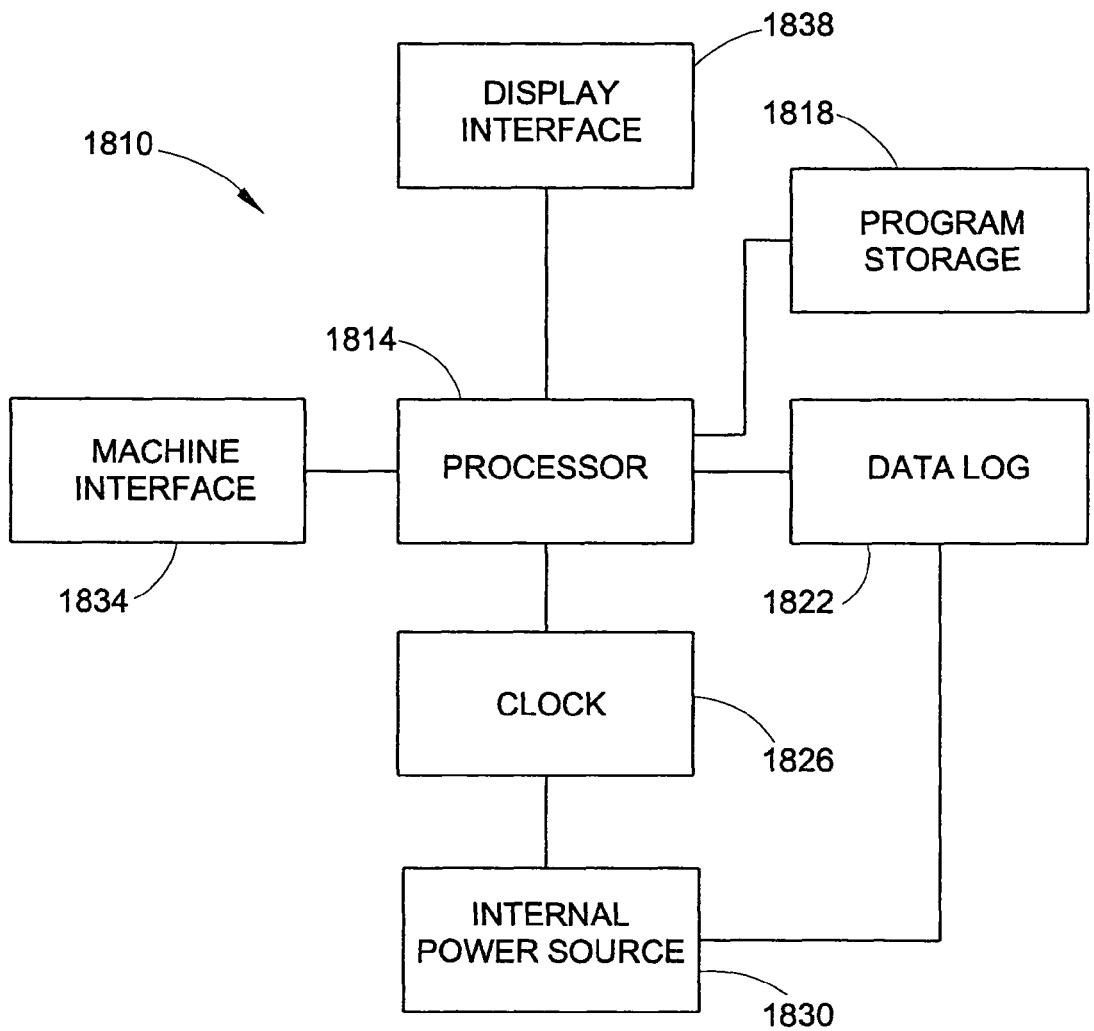
FIG. 18 is a block diagram of an exemplary embodiment of a device for recording data regarding one or more operational aspects of a machine.

FIG. 4 provides the block diagram of the in-vehicle computer system. The device 300 is comprised of several principal components, such as an on-board data storage device, an input/output subsystem for communicating to a variety of external devices, a central processing unit and memory device and a real time operating kernel for controlling the various processing steps of the device 300. It is known that all of these functions can be included in a single dedicated microprocessor circuit. One embodiment of the device 300 is discussed in greater detail with reference to FIG. 18. The device 300 essentially communicates with one or more machine or vehicle components for acquisition of information representative of various actual vehicle operating aspects or characteristics. A driver input console 410 may allow the driver to input data for satisfaction of various threshold factors which need to be satisfied. For instance, the console may allow the machine operator to enter an identification number so that operational characteristics can be recorded in association with a particular machine operator. Alternatively, the console may include a biometric sensor, such as, for example, a finger print or retinal scanner for positively identifying the operator.

For instance, a driver authentication system is intended, such as where several individual drivers (same family, etc.) may properly use the vehicle, but each may have different ratings for insurance computations.

The physical operation of the vehicle is monitored through various sensors 412 in operative connection with the vehicle or machine data bus, while additional sensors 414 not normally connected to the data bus can be in direct communication with the device 300 as will hereinafter be more fully explained.

The vehicle may be linked to an operation control center 416 by a communications link 418, preferably comprising a conventional cellular telephone interconnection, but also comprising satellite transmission, magnetic or optical media, radio frequency or other known communication technology. A navigation sub-system 420 may receive radio navigation signals from a positioning device 422 which may include, but is not limited to GPS, radio frequency tags, or other known locating technology. If these elements are included, they may communicate with the device 300 directly or via the data bus.

The type of elements monitored and recorded by the subject invention may include raw data elements, calculated data elements and derived data elements. For example, these can be broken down as follows:
Raw Data Elements:
    Information from power train sensors
        RPM,
        transmission setting (Park, Drive, Gear, Neutral),
        throttle position,
        engine coolant temperature,
        intake air temperature,
        barometric pressure;
    Information from electrical sensors
        brake light on,
        turn signal indicator,
        headlamps on,
        hazard lights on,
        back-up lights on,
        parking lights on,
        wipers on,
        doors locked,
        key in ignition,
        key in door lock,
        horn applied;
    Information from body sensors
        airbag deployment,
        ABS application,
        level of fuel in tank,
        brakes applied,
        radio station tuned in,
        seat belt on,
        door open,
        tail gate open, odometer reading,
cruise control engaged,
anti-theft disable,
occupant in seat,
occupant weight;
Information from other elements
vehicle speed,
vehicle location,
date,
time,
vehicle direction,
IVHS data sources
pitch and roll,
relative distance to other objects.
Calculated Information:
deceleration;
acceleration;
vehicle in skid;
wheels in spin;
closing speed on vehicle in front;
closing speed of vehicle in rear;
closing speed of vehicle to side (right or left);
space to side of vehicle occupied;
space to rear of vehicle occupied;
space to front of vehicle occupied;
lateral acceleration;
sudden rotation of vehicle;
sudden loss of tire pressure;
driver identification (e.g., through voice recognition, code, fingerprint or retinal recognition);
distance traveled; and
environmental hazard conditions (e.g. icing, etc.).
Derived Data Elements:
vehicle speed in excess of speed limit;
observation of traffic signals and signs;
road conditions;
traffic conditions; and
vehicle position.
This list includes many, but not all, potential data elements.

With particular reference to FIG. 1, a flowchart generally illustrating a data capture process within the vehicle for insurance and claims processing is illustrated. Such a process can be implemented with conventional computer programming in the real time operating kernel of the device 300. Although it is within the scope of the invention that each consumer could employ a unique logic associated with that consumer's machine or unit of risk, based on the underwriting and rating determination (FIG. 6), as will be more fully explained later, FIG. 1 illustrates how the data capture within a particular consumer logic is accomplished. After the system is started 100, data capture is initiated by a trigger event 102 which can include, but is not limited to:
Ignition On/Off
Airbag Deployment
Acceleration Threshold
Velocity Threshold
Elapsed Time
Battery Voltage Level
System Health
Date
Time
User Activation/Panic Button
Traction
Location/Geofencing
Driver Identification
Remote Activation Trigger event processing 104 can comprise three elements: a flow process for contacting a central control 106, contacting a claims dispatch, and/or recording trigger event data 110. Trigger event processing can include, but is not limited to:
Contact External Entities
EMT (Emergency Medical Transport), Claims Dispatch, Other External Entity Takes Appropriate Action
Record Sensor Information
Transmission of Data
Recalibration
Load Software If trigger event processing comprises contact central control, the inquiry is made, and if affirmative, the central control is contacted 112, the central control can take appropriate action 114, and a record is made of the action taken by the central control 116. For the process of claims dispatch 108, the system first contacts 120 the claims dispatch service department of the insurer, the claims dispatch takes appropriate action 122 and a recording 124 of the claims dispatch action information is made.

The recording of trigger event data can include, but is not limited to:
The Trigger
Location information such as latitude and longitude
Time, such as, Greenwich Mean Time
Velocity
Acceleration
Direction
Deceleration
Vehicle Orientation
Seatbelt Status
Data capture processing concludes with end step 130.

The recording may include monitoring a plurality of raw data elements, calculated data elements and derived data elements as identified above. Each of these is representative of an operating state of the vehicle or an action of the operator and therefore, represents an operational aspect of the machine. Select ones of the plurality of data elements are recorded when the ones are determined or believed to have an identified relationship to the safety standards. For example, vehicle speed is likely to be related to safety. Therefore, speed may be recorded on a regular basis (e.g. every 10 seconds). Alternatively, where memory or storage space is a factor, speed may be recorded less often when it is below a threshold. The recording may be made in combination with date, time and/or location information. Other examples of data that may be recorded are excessive rates of acceleration or hard braking (deceleration) events. These may be calculated data elements determined, for example, from speed measurements made every second or can be measured data elements received directly or indirectly from one or more accelerometer of the vehicle.

The recording process is practically implemented by monitoring and storing the data in a buffer for a selected period of time, e.g., thirty seconds. Periodically, such as every two minutes, the status of all monitored sensors for the data elements is written to a file which is stored in the vehicle data storage within the device 300. The raw, calculated and derived data elements listed above comprise some of the data elements to be so stored. Only those data elements determined or deemed to be most relevant by the insurer need be stored.

Some "trigger events" can be a combination of sensor data possibly requiring additional action or which may result in a surcharge or discount during the insurance billing process. In some embodiments, certain trigger events may trigger immediate upload 106 to a central control which will then take appropriate action 114. For example, a rapid deceleration in combination with airbag deployment may be a trigger event indicating a collision, in which case the system could notify the central control of the vehicle location and status. Alternatively, if the operator were to trigger on an emergency light, similarly the system could notify the central control of the vehicle location indicating that an emergency is occurring.

Trigger events can be divided into two groups: those requiring immediate action and those not requiring immediate action, but useful for determining a cost of insurance. Those useful for determining the cost of insurance can be recorded in the same file with all the other recorded vehicle sensor information. Those trigger events requiring action can be uploaded to a central control center which can take action depending on the trigger event. Some trigger events can indicate the dispatch of emergency services, such as police or EMS, and others will require the dispatch of claims representatives from the insurance company.

The following comprises an exemplary of some, but not all, trigger events:

Need for Assistance:

These events could require immediate notification of the central control center.

1. Accident Occurrence. An accident could be determined through the use of a single sensor, such as the deployment of an airbag. It could also be determined through the combination of sensors, such as a sudden deceleration of the vehicle without the application of the brakes.

2. Roadside assistance needed. This could be determined through the pressing of a "panic button" in the vehicle or through the reading of a sensor, such as the level of fuel in the tank. Another example would be a rapid loss of tire pressure, signifying a flat tire.

3. Lock-out assistance needed. The reading of a combination of sensors would indicate that the doors are locked, but the keys are in the ignition and the driver has exited the vehicle.

4. Driving restrictions. The insured can identify circumstances in which he/she wants to be notified of driving within restricted areas, and warned when he/she is entering a dangerous area. This could be applied to youthfull drivers where the parent wants to restrict time or place of driving, and have a record thereof.

Unsafe Operation of the Vehicle

These events could be recorded in the in-vehicle recording device for future upload. Constant trigger events would result in notification of the driver of the exceptions.

1. Excessive speed. The reading of the vehicle speed sensors would indicate the vehicle is exceeding the speed limit. Time would also be measured to determine if the behavior is prolonged.

2. Presence of alcohol. Using an air content analyzer or breath analyzer, the level of alcohol and its use by the driver could be determined.

3. Non-use of seatbelt. Percent of sample of this sensor could result in additional discount for high use or surcharge for low or no use.

4. Non-use of turn signals. Low use could result in surcharge.

5. ABS application without an accident. High use could indicate unsafe driving and be subject to a surcharge.

Figure 2:
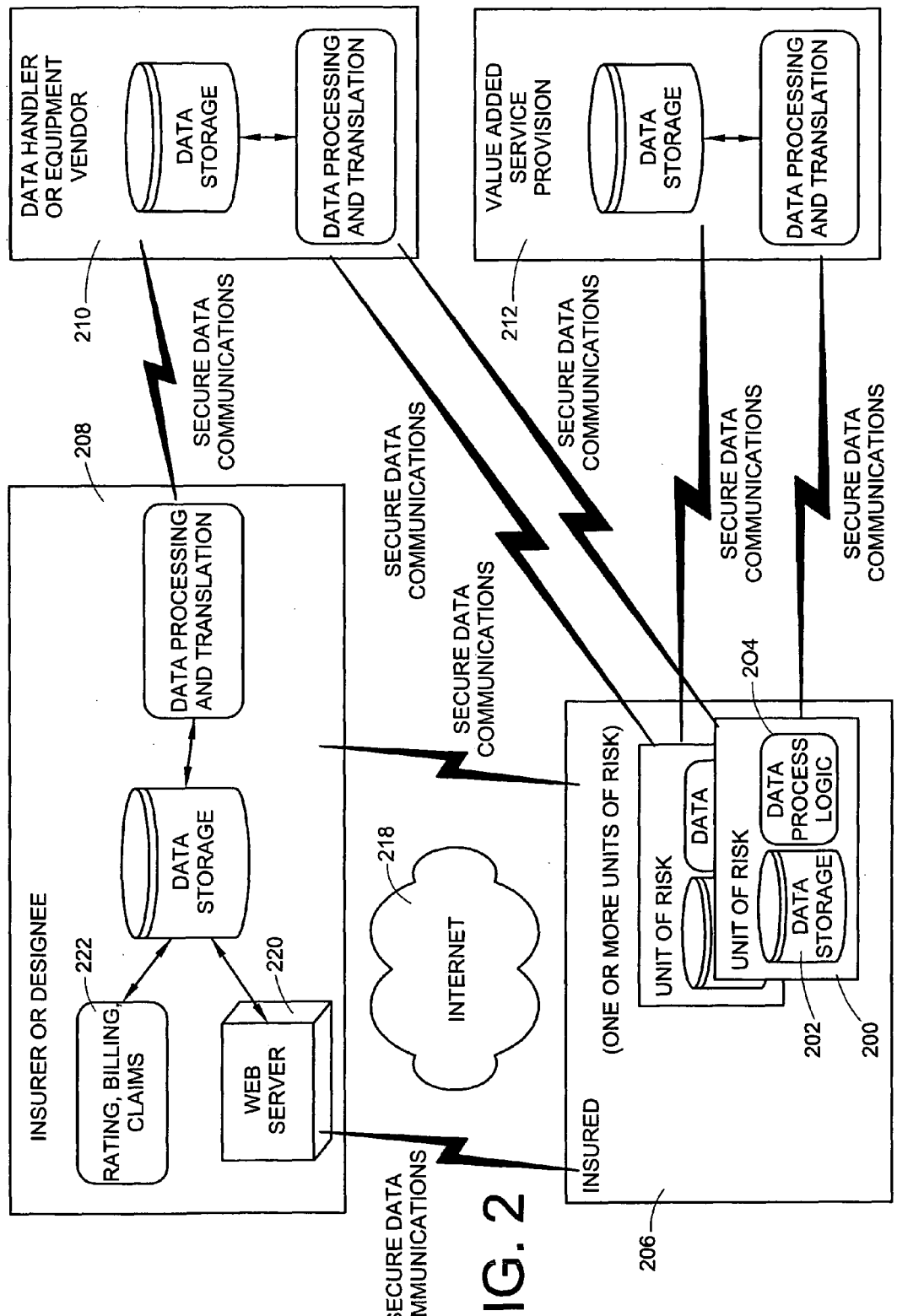
FIG. 2 is a block diagram generally illustrated in the communication network design the unit of risk including a response center of the insurer and a data handling center.

With particular reference to FIG. 2, a general block diagram/flowchart of the network design for gathering appropriate information for insurance billing on a periodic basis is illustrated. Each machine or unit of risk 200, which as noted above, can just as easily be a factory or farm machine, an airplane or boat, as well as a motorcycle or automobile, includes the data storage 202 and data process logic 204 as described more in detail in FIG. 4. As will be described in greater detail with reference to FIG. 7-FIG. 17, the insured or potential customer 206 associated with or responsible for each unit of risk communicates within the insuring entity 208 or its designee (by "designee" is meant someone acting for the insurer, such as a dedicated data collection agent, data handler or equipment vendor 210 and/or a value added service provider 212.) The data handler can be a third party entity verifying that the operating equipment of the system is in proper working order and, as such, will usually be a subcontractor to the insurer. A value added service provider is another third party entity, such as a directional assistance service, a security firm, a vehicle monitoring company or telephone service provider, also apart from the insurer, whose communications with the units of risk may be important or useable to the insurance computation algorithms.

Another important feature of FIG. 2 is that the insured or potential customer 206 may not only communicate with the insurer 208 through the communications link 418 (FIG. 4), but preferably through an Internet 218 communications path after reviewing recorded information. Such communication will occur through a Web server 220 and the insurer's Web site so that an insured or potential customer 206 may get on-line with the insurer 208 to observe and verify recorded data, claims processing, rating and billing 222, as well as acquire improved insurance cost estimations and information regarding how to reduce or control insurance costs by modifying machine or vehicle operating behaviors, as will hereinafter be more fully explained.

Figure 5:
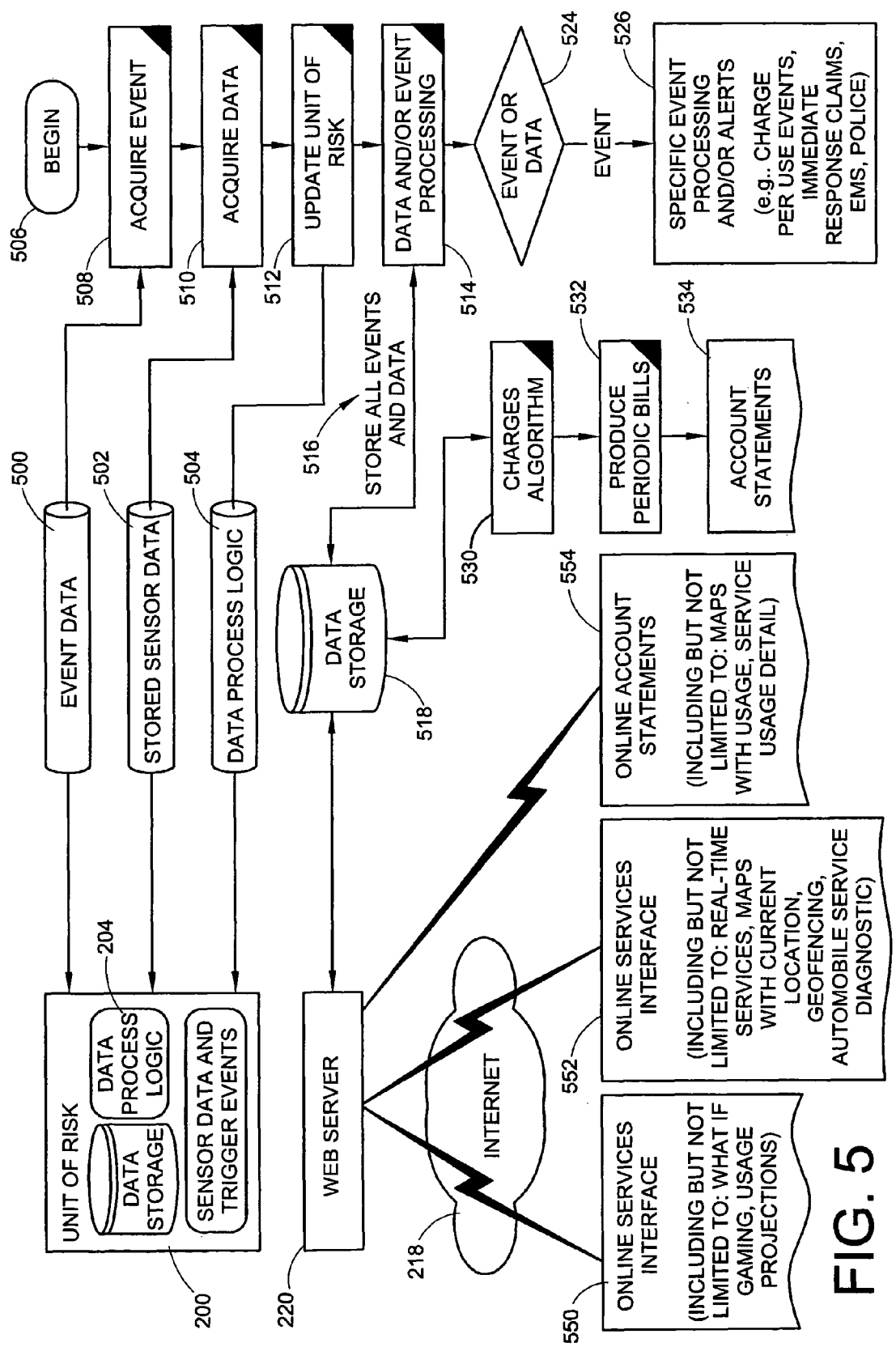
FIG. 5 is a block diagram illustrating use of acquired data including communication through Internet access.

With particular reference to FIG. 5, a more detailed description of system use of data acquired from the unit of risk is explained with particular attention to advantageous Internet communications. The unit of risk 200 (device 300) is primarily concerned with transferring three classes of data between it and the insurer. The event data 500 and stored sensor data 502 have been discussed with reference to FIG. 1. Data process logic 504 is particular processing logic that can be transferred from the insurer to the unit of risk that is adapted for acquiring data especially important for assessing the particular unit's insurance costs. For example, if a particular unit has a special need for providing information about brake pedal application, special data process logic will be provided to that unit to store data related to this activity. On the other hand, for many other units such data may not be necessary and so the unit may operate with standard data process logic 204. The important feature of special data process logic 504 is that the data process logic 204 for a unit of risk can be regularly updated as either the insured or potential customer or the insurer desires, or as events warrant. One easily foreseeable special data process logic would be related to breathalyzer analysis.

The process flowchart starting at Begin 506 more generally describes the communication activity between the insurer and the unit of risk. The insurer will acquire event data 508 and sensor data 510, may update 512 the data process logic and then process 514 the raw data elements to generate either the calculated or derived data elements. Alternatively, the device 300 processes raw data elements to generate the calculated and/or derived elements and stores them for upload and display along with raw data elements. All relevant data is stored 516 in a conventional data storage device 518. If the stored item is an event 524, then the insurer may generate some sort of response to the event. For example, if there is an airbag deployment and the data is delivered in real time, the insurer may actually try to communicate with the vehicle, and upon failure of communication, may initiate deployment of emergency medical or police service. If this specific event processing and/or alerts 526 occurs, the system may initiate a charge per use event. For instance, charges can also include immediate response claims, EMS contact charges or police dispatch charges. The data or events which are stored in stored device 518 are accessed by a billing or estimating algorithm 530 to generate a cost of insurance for the unit of risk in consideration of all the relevant data and events occurring which are recorded and stored in the storage device. It can be a special feature of the subject invention that the cost of insurance for a given period is determined, at least in part, on the basis of operating characteristics of the vehicle and operator action recorded during that same period, and may be based upon the real time data occurring contemporaneously with the billing so that the system provides an insurance use cost, as opposed to an estimation based upon historical data. Alternatively, customized discounts or surcharges are determined for a next or future billing period based on operational aspects or behaviors represented by recorded information provided for the current or previous billing period. After a relevant cost is computed, a bill or estimate is produced and typically mailed or otherwise communicated to a customer as an account statement 534 or offer of insurance.

Another important feature of the subject invention illustrated in FIG. 5 and explained in greater detail in reference to FIG. 10-FIG. 17, is that the insurer provides a Web server 220 to allow a customer to access via Internet 218 communication, the relevant sensor data and event data associated with the customer.

Two different types of on-line services' interfaces are illustrated: a prospective on-line services interface 550, or an interface 552 for reporting acquired data. The data reports through the acquired service interface may comprise all of the stored event and sensor data, along with enhanced processing maps showing travel routes during the billing period, or even a map showing current location of the unit of risk. By Geofencing is meant to identify when the unit travels outside of a certain geographical area. It is even possible to determine whether automobile maintenance service is appropriate by diagnostic analysis of the sensor and event data.

The prospective interface relates to "what if" gaming where a customer can project certain usages of the unit of risk or driver actions, and the system can, in combination with similar occurring usage in the past, or based upon the overall customer profile or matrix, project a estimated cost for such usage. In effect, a user can determine, in advance, what particular usage of the unit or driver action will generate an insurance cost or savings with a very reliable associated insurance estimate.

Lastly, enhanced account statements 554 can also be communicated on-line, wherein maps with usage or service usage details can be provided as a more detailed explanation of the resulting costs of an account statement.

Figure 6:
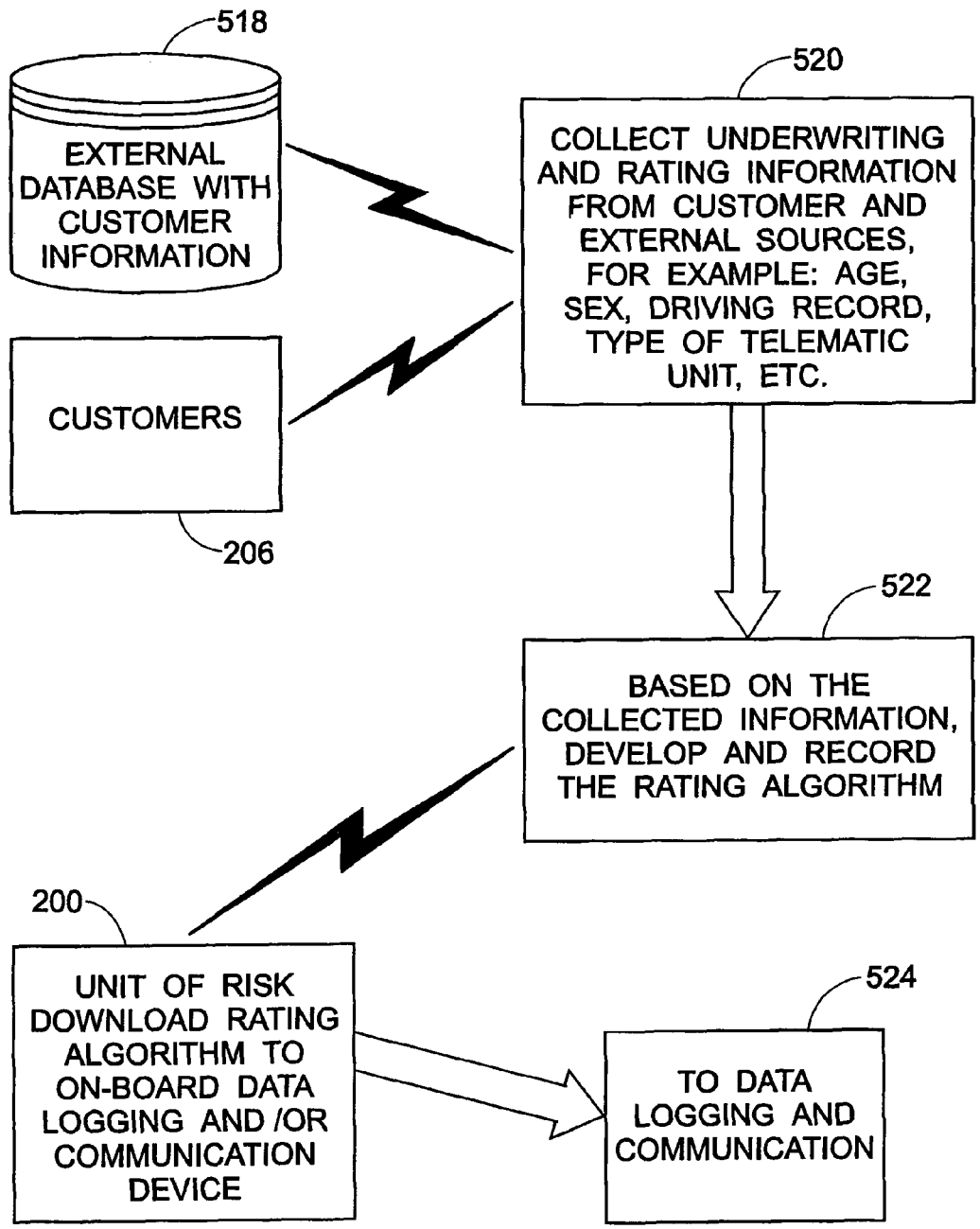
FIG. 6 is a block diagram/flowchart illustrating an underwriting and rating method for determining a cost of insurance in conjunction with the system of FIG. 4.

With particular reference to FIG. 6, the subject invention is particularly useful for generating improved rating determinations due to the improved acquisition and amount of relative data for assessing insurance costs for a unit of risk. In the manner as discussed above, the database 518 has the benefit of the data from a plurality of customers and non or potential customers 206 and other drivers/operators. Over time, an insurer can use the accumulated underwriting and rating information from individual customers 520 to develop improved rating algorithms 522, 530 and databases 518. Such improved algorithms can be regularly communicated to the units of risk 200 for improved insurance cost computation accuracies. The improved rating algorithms can be communicated 524 to the units of risk on-board device 300 (FIG. 4).

The subject invention is also applicable as a process for collecting data to be used for the following insurance and non-insurance related purposes: advertising and marketing; site selection; transportation services; land use planning; determining road design, surface or composition; traffic planning and design; and road conditions.

Figure 7:
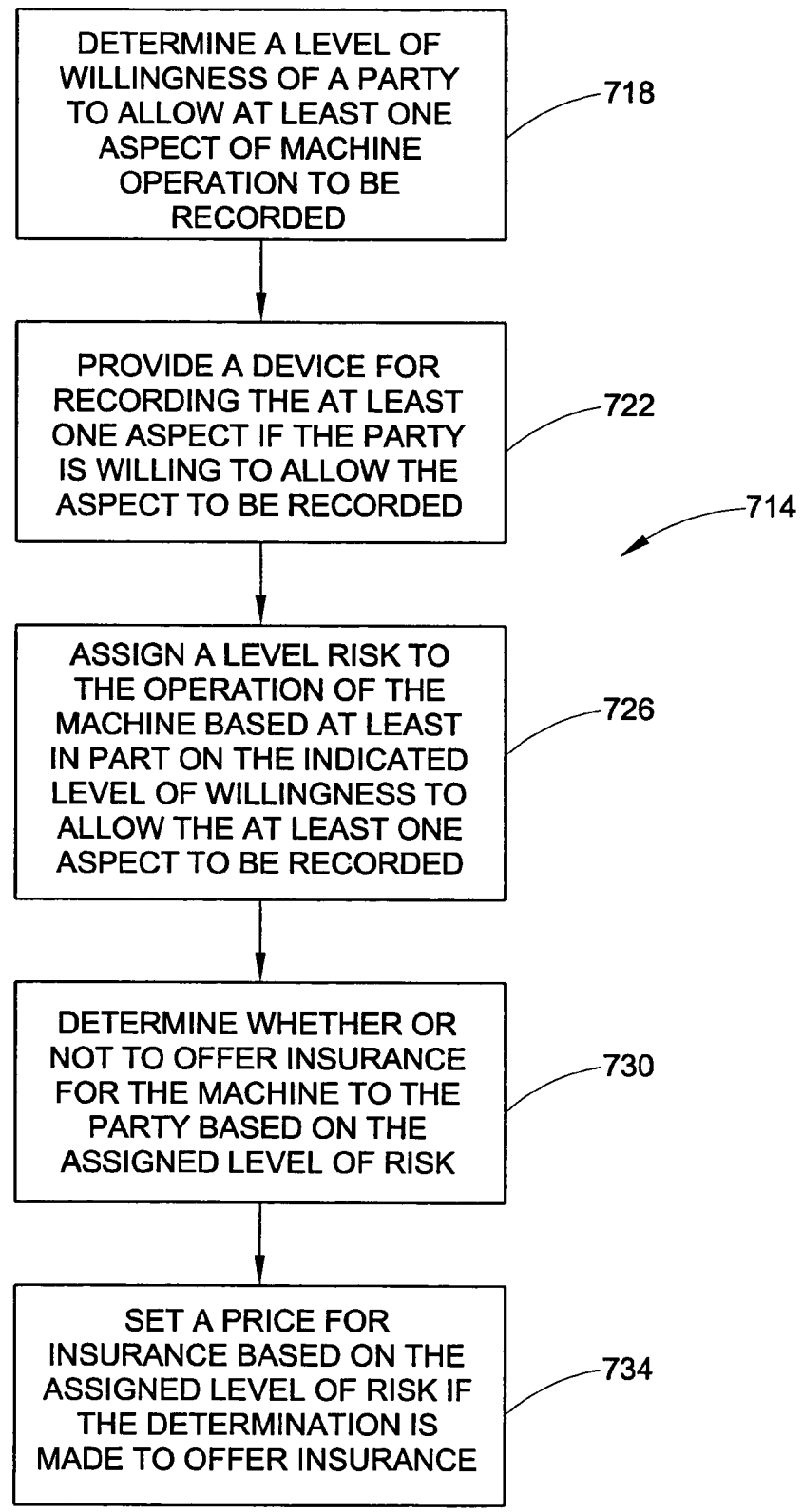
FIG. 7 is a flow chart outlining a method of insurance underwriting and rating related to the operation of a machine associated with a party.

For example, referring to FIG. 7, a method 714 for underwriting insurance related to the operation of a machine associated with a party includes determining 718 a level of willingness of the party to allow at least one aspect of machine operation to be recorded, providing 722 a device for recording the at least one aspect if the party is willing to allow the at least one aspect to be recorded, assigning 726 a level of risk to the operation of the machine based at least in part on the indicated level of willingness of the party or operator to allow the at least one aspect to be recorded, determining 730 whether or not to offer insurance for the machine to the party based on the assigned level of risk and setting 734 a price for the insurance based on the assigned level of risk if the determination is made to offer insurance. It should be noted that, since the price or cost of insurance is set 734 based on the assigned 726 level of risk and the level of risk is assigned 726 based at least in part on the indicated level of willingness of the party or operator to allow the at least one aspect to be recorded, included within the method 714 for marketing insurance is a method for determining a cost of insurance directly related to the operation of a specific machine by the insurance applicant. Furthermore, aspects of the method 714 for underwriting and pricing insurance, such as the presentation of cost and other information, as will be described in greater detail below, can influence machine operator behavior. Therefore, aspects of the method 714 for marketing comprise a method for modifying operator or driver behavior and/or for controlling insurance cost.

Determining 718 the level of willingness of a party to allow at least one aspect of machine operation to be recorded can be achieved a number of ways. For example, if an unsolicited request for the device (e.g. 300) for recording is received, it may indicate a relatively high level of willingness or enthusiasm for allowing at least the one aspect of machine operation to be monitored or recorded. Over time, it may be determined that machine operators or owners who are not currently customers of an insurer, but who request the device for recording, are more enthusiastic or have a higher level of willingness to have the at least one aspect of their machine operation monitored than, for example, current customers of the insurer who request the device. For instance, it may be determined that current customers have ready access to contact information and can request the device with less effort (implying a lower enthusiasm threshold than a non-customer). Receiving a request for the device after making an offer to provide the device, may indicate a similar level of willingness or may indicate a somewhat diminished level of willingness. Again, someone responding to an offer has an easier route to receiving the device than someone who has not received an offer and requests the device at his own initiative.

It is assumed that a level of willingness to have an aspect of machine operation monitored may be related to a manner in which the machine is normally operated. For instance, it is assumed that automobile drivers who believe themselves to be careful automobile drivers would be or are more willing to have an aspect of their driving, such as, for example, the speed at which they drive, monitored and that those who are aware that others would consider them reckless would be less willing to have an aspect of their driving monitored. However, these assumptions may inaccurate. Over time, an insurer can accumulate a database (e.g., 518) including information correlating the degree of willingness (or unwillingness) to allow recording or monitoring, as well as data regarding the at least one aspect of operation, with a level of risk for various categories of parties.

Of course, parties that actually use the device (e.g. 300) for recording the at least one aspect of machine operation indicate a greater willingness to allow one or more aspects of machine operation to be recorded than do those who merely request the device, but do not thereafter actually use the device. Again, it is assumed that those parties that install the device and allow it to record one or more machine operation aspects are more likely to be careful machine operators than are those who do not. Furthermore, those who review the recorded information to determine, for example, if they are indeed as careful as they believe they are, express a greater willingness to allow the monitoring and are likely to be among the most careful drivers. Those who actually provide the recorded information to the insurer express an even greater willingness to be monitored and are likely to be the most careful machine operators of all.

Of course, all of these assumptions about a relationship between these expressions of willingness to allow at least one aspect of machine operation to be recorded are subject to verification and adjustment based on data collected correlating actual insured losses of insured parties associated with insured machines and the level of willingness to allow monitoring expressed by the insured parties (or, non-customers who provide data for estimation purposes) associated with the losses and others in related actuarial classes.

As explained above, a level of risk assigned or associated with a party and/or the operation of a machine associated with the party can be based on many factors, such as the sex, age, marital status, and address of an insured party or machine operator. Assigning 726 a level of risk to the operation of the machine based at least in part on the indicated level of willingness to allow the at least one aspect to be recorded can also be accomplished in conjunction with assigning a level of risk based on these known factors.

Additionally, assigning 726 a level of risk to the operation of the machine can include an evaluation of data recorded by the device (e.g., 300), or a copy thereof, received from the party associated with the machine. For instance, where the machine is a vehicle, such as an automobile, truck, motorcycle, boat or airplane, the at least one recorded aspect of machine operation might include speeds at which the vehicle was operated, acceleration events, deceleration events and/or locations where the vehicle was operated, as well as seat belt usage, turn signal usage and the times and dates of vehicle usage. One or more of these aspects of machine operation, either alone or in combination with one or more of the previously identified characteristics (such as operator age, sex or location) can be compared with assumptions about safe operation determined by the insurer or with actuarial data aggregated from copies of similar data previously received from other operators or owners of similar machines and stored in a database (e.g., 518) of the insurer. The results of such comparisons are used in assigning 726 a level of risk to the operation of the machine by the associated operator or owner.

For instance, if the evaluation of data received from the device 300 of a party indicates that a relatively high percentage of vehicle operation is done at a speed deemed to be unsafe by the insurer, based either on practical assumptions or actuarial evidence, the operator and/or machine may be placed in or assigned a high risk category. Additionally, or alternatively, if the recorded at least one aspect indicates a relatively large number of aggressive accelerations and/or decelerations for a number of miles driven, the operator and/or vehicle/operator combination may be assigned a high risk category or actuarial tier. Again, previously known actuarial parameters may be used in evaluating the at least one recorded operational aspect. For instance, location-based actuarial data may indicate that even the safest class of drivers perform rapid decelerations frequently in an urban setting as compared to safe drivers in rural locations. Therefore, allowances might be made or varied based on location or other factors. For instance, where location information is unavailable, a location type may be inferred from data that is available. For example, data may be stored or processed in relation to trips. A trip starts when the ignition of the vehicle is turned on and ends when the ignition of the vehicle is turned off. If a high percentage of the recorded trips are short (i.e., below some threshold distance and/or time), then it might be inferred that the vehicle is garaged in an urban environment or is used mostly for city driving. Of course, the speed at which the vehicle is driven during the short trips may also be a factor in making such inferences.

Data validation or verification can also play a part in assigning 726 the level of risk and/or in setting 734 the price or cost of insurance. For instance, the device 300 can log vehicle identification information (e.g. vehicle identification number (VIN) or network protocol information) whenever the device is installed in a motor vehicle. At least some of this information is available from the vehicle network and can be received and logged by the device 300. Additionally, where the device or machine include a console for entering operator identification information (e.g. code numbers, I.D. cards, biometric scans), this information can also be received and logged by the device 300. Where the device 300 or vehicle include, or are in communication with, location determining equipment (e.g., G.P.S. or cellular triangulation), this information can also be recorded by the device. This recorded information can be compared against information provided earlier by the party. For instance, a recorded VIN can be compared to a vehicle description provided by the party during an insurance application filing procedure. Similarly, location information recorded by the device can be compared against "garage location" information provided in a policy renewal form. Operator identification and vehicle mileage information can be compared against operator lists and mileage estimates provided in policy application forms.

Data provided by the party that is found to be incorrect may simply be corrected and the recorded data used in assigning 726 risk for setting 734 prices or costs. Alternatively, or additionally, the fact that incorrect data was provided by the party may be factored into those calculations. For example, certain incorrect data may be a flag for fraud and may place the party in an uninsurable underwriting class or in a higher risk tier.

The assigned 726 level of risk can include one or both of an underwriting tier and an insurance rate and can be used to determine 730 whether or not to offer insurance covering the machine. Alternatively, whatever the level of risk assigned 726, insurance can be offered and the level of risk assigned 726 is reflected in the price set 734 for the insurance.

The marketing method 714 can be applied toward current customers of an insurer or to parties and machines not currently covered by insurance plans of the insurer.

For instance, non-customers, current or continuing customers or insured parties of an insurer may be provided with means to review recorded data regarding one or more aspect of operation of a machine associated with the customer or non-customer, on a regular basis, at policy renewal time or while the potential customer is evaluating potential insurers.

In reviewing the recorded data, the current or ongoing customer and/or potential or non-customer indicates a particular level of willingness to allow the aspect to be recorded. Furthermore, after such reviews, or instead of them, the current or ongoing customer or the non-customer may transmit the recorded data to the insurer for the insurer to review and analyze in determining a price of future or past insurance coverage. For example, a retroactive discount may be applied to an insurance premium associated with the period for which the data was recorded. Alternatively, assumptions may be made about future machine operation based on the past performance indicated by the recorded data and a discount or surcharge may be applied to one or more upcoming periods of insurance. Non-customers may be provided estimates or offers of insurance that include pricing information based on the fact that the non-customer used the provided means to review recorded machine performance data. Where a current customer contracts for insurance on a prepaid per mile (or kilometer) or per minute (or other unit of time) basis, the provided means for reviewing the recorded data can be used to determine and display a number of miles or number of minutes remaining from the prepaid amount. Furthermore, based on the amount of driving indicated by the recorded data, the means for reviewing the recorded data may also provide an estimate for when the total prepaid insurance amount will be consumed. This allows the prepaid customer to plan or budget for making a new prepayment to "re-charge" their pre-paid insured minutes or miles account.

Furthermore, decisions about insurance levels and insurance periods may be based on the determined 718 level of willingness to allow the at least one aspect of machine operation to be recorded and on recorded data (or copies thereof) if they are received from the insured party. These determinations may be considered to be part of the determination 730 as to whether or not to offer insurance. For example, it may be determined 730 that a machine or machine operator is associated with or assigned 726 a risk level or underwriting tier that is too high to accept for a twelve month period, but may represent an acceptable risk for a three or six month period. For instance, the party may currently be a non-customer of the insurer. The non-customer may have requested a device for recording the at least one aspect of machine operation, installed the device and recorded the at least one aspect of machine operation for an extended period of time and then transmitted or uploaded the recorded information to the insurer. It may be assumed, or it may be supported by actuarial information, that all of these actions indicate that the operator is responsible, sober and careful. Nevertheless, the uploaded data may indicate that, for example, a vehicle of the non-customer was regularly driven at excessive speed and/or with overly aggressive accelerations and decelerations. For this reason, the insurer may be unwilling to commit to insuring the non-customer for an extended period of time, but may be willing to underwrite the operation of the machine by the non-customer for a shortened trial period in anticipation that a review of the recorded data by the non-customer and consideration of information regarding how the current non-customer could reduce a cost of insurance by modifying how the current non-customer operates the machine would in fact cause the current non-customer to modify machine operation behaviors, thereby affecting a reassignment 726 to a reduced risk level or underwriting tier or classification. Based on such a future reassignment, the insurer may determine 730 to underwrite or insure the machine operation for the new customer for a longer period of time and/or set 734 a lower price for the coverage.

The behavior modifying and/or cost controlling aspects of the method 714 for marketing insurance may include providing a means for the party to review recorded information regarding the at least one aspect of machine operation. For instance, the provided means for reviewing the recorded information may present the recorded information in conjunction with information indicating how the recorded information, if provided to the insurer, would affect the cost of insurance.

For example, the insurer may provide the party (customer or non-customer) with display software that can be run on a home computer. The display software may allow the party to upload or transfer the recorded information, or a copy thereof, from the device 300 to the home or personal computer or work station of the party. The display software may present all of the recorded data or selected summary information. For instance, a graph may be provided on a trip by trip basis showing the recorded speed of a vehicle, distance traveled and/or the duration of the trip, on a minute by minute or other time related basis. Alternatively, the display software may present summary information indicating a percentage of time the vehicle was operated within particular speed ranges, at high risk or low risk locations (routes) or times, with overly aggressive accelerations or decelerations or summaries of any other aspects of machine operation that may be deemed of interest by the insurance provider. As explained above, other aspects that may be deemed of interest and therefore recorded by the device 300 include turn signal use, seat belt use, vehicle roll, vehicle yaw, entertainment system on or off status, radio or television station, compact disc or DVD being played, telephone use, convertible top up or down status and/or tire pressure to name but a few. Where the machine is a piece of factory equipment, various line speeds, operating pressures, safety gate status, temperatures and/or operator run times are among aspects that might be selected for recording, display to the party and delivery to the insurer. Temperatures, pressures, and speeds are also among parameters or aspects of operation that might be recorded, displayed to the party and transmitted to an insurer with regard to the operation of farm equipment. Furthermore, machine configuration information (e.g., harvester, plow, planter or other configurations) may be recorded, displayed to the party and transmitted to the insurer.

Preferably, the means for the party to review the recorded information includes a means for reviewing the recorded information in conjunction with information indicating how providing the recorded information to the insurer would affect the cost of insurance. For example, the software may display summary information regarding the recorded information in conjunction with a message indicating that a five percent discount would be applied to a premium associated with the party if the data were transmitted to the insurer or a service provider of the insurer. Additionally, or alternatively, the software package may indicate or highlight portions of the recorded information that qualify the party for additional discounts. Portions of the recorded data that would be associated with surcharges or reductions in discounts might also be highlighted and explained. Furthermore, the means for the party to review the recorded information may allow the party to manipulate or modify the displayed data in order to learn how changing operational behavior would affect the cost of insurance in the future. For example, where the recorded data indicates that the highest speed at which a vehicle was driven was 80 miles an hours and that driving at 80 miles an hour has an adverse effect on the available discount to an insurance premium, the means for the party to review the recorded information, or display software, allows the party to change the maximum speed value to 75, 70 and/or 65 for "what-ifing"

purposes and observe associated increases in the available discount, or reduction of a surcharge, that would be applied to a future cost of insurance should the party reduce the maximum speed at which the vehicle is operated in the future.

In some embodiments, providing a means for the party to review recorded information regarding the at least one aspect of machine operation includes providing a means for comparing the operational behavior of the party with the operational behavior of other parties. For instance, the recorded data of the party can be compared with an average or aggregate set of data from other parties who have provided operational data to the insurer in the past. Comparison can be made to an average or aggregate of all parties who have uploaded data, an average or aggregate of data provided by operators with similar characteristics (e.g. age, sex, location), an average or aggregate of data provided by parties associated with similar machines (same model car, same model milling machine, same size heat treating furnace, same model tractor or same model combine) or a combination of any of any of these classifications or others.

In some embodiments, providing a means for the party to review recorded information regarding the at least one aspect of machine operation can include providing a means for transferring the recorded information, or a copy thereof, from the device configured to receive and record information to a device configured to display at least a portion of the recorded information. For example, providing a means for transferring the recorded information, or a copy thereof, can include providing a cable for connecting the device 300 to a communications port (e.g., and RS-232, USB port or a parallel port) of a home computer, programmable digital assistant or other computation platform. Alternatively, the means for transferring a copy of the recorded information from the device 300 to the display device can include providing a wireless connection. For example, the device 300 may include means for wireless communication, such as for example, Bluetooth® or other wireless networking or communications technology. A compatible device is provided for installation in the home computer, work station or personal digital systems (display device). Where the display device can be brought to the machine (e.g., motor vehicle), connection to the display device (e.g., with a cable) can be made while the device 300 is attached to the machine. For example, a cable can be connected between a personal digital assistant or laptop computer and the device 300 while the device 300 is connected to an OBDII connector in an automobile.

Alternatively, if the device 300 includes a wireless communications technology (e.g. Bluetooth®), a connection between the device 300 and the display device can be made even when the display device is positioned somewhat remotely from the device 300 configured for receiving and recording the at least one aspect of machine operation. For example, a device 300 included in an automobile may be able to establish a connection with a home computer when the vehicle is parked adjacent to a home housing the home computer. For instance, an automobile parked in the driveway or garage of the home may be within range of the wireless technology and a connection for transferring a copy of the recorded information from the device 300 to the display device may be established.

Alternatively, the device 300 for receiving and recording information is removed from the machine and connected to the display device. For instance, on a regular basis (e.g., monthly, quarterly, or yearly) the party removes the device 300 from the machine and places it in communication with a display device. For instance, a wireless or wired connection is established between a personal computer or other computational platform and the device 300 configured for receiving and recording data. Once the connection is established between the computational or display device and the device 300 configured for receiving and recording data, some or all of the recorded data can be transferred or copied to the display device and the data can be displayed, processed, manipulated, analyzed and compared to other data as explained above. Preferably the data is recorded in the device 300 for receiving and recording data in an encrypted form. In that case, software included in the display device or personal computer includes a decryption algorithm. The data is stored and transferred to the display device in encrypted form in order to prevent or discourage data tampering.

In yet another alternative, only a portion of the device 300 is removed from the machine to provide the means for transferring the recorded information, or copy thereof, from the device 300 to the display device. For example, the device 300 includes a removable memory card or stick. The recorded data is stored on the removable storage element. The device configured to display at least a portion of the recorded information includes or is associated with a memory or removable storage element reader. The removable storage element is removed from the device and placed in communication with the reader. The reader reads information from the removable element. Optionally, the removable element is erased. The removable element may be reinstalled in the device 300 and used to record more information. Alternatively, the removable element is not erased. Instead it is stored for archival purposes and a replacement removable storage element is installed in the device 300. Of course, memory cards and sticks are only exemplary removable elements. Other devices may be used. For example, floppy disks and recordable compact disks and digital video disks can be used as removable memory or storage elements.

After reviewing the data, or without reviewing the data, the party may select or decide to transmit the data to the insurer. For example, the party may be rewarded with a discount for insurance for merely uploading or transmitting the data to the insurer. Additionally, the data may indicate that the insured party is entitled to additional safe operation discounts. The means for reviewing the data can include a means for transmitting or uploading the data to the insurer. Upon receiving and reviewing the data, the insurer applies the appropriate discounts and/or surcharges to the cost of insurance for the party. If the party is a non-customer, the cost of insurance is exemplary and is transmitted to the non-customer as an estimate for comparison purposes.

In some embodiments, data is stored in two forms in the device 300 for receiving and recording data. The first form is a first encrypted form for communication with the display device. The second set of data is encrypted by a second means or an additional encryption means. The second set of data is for transmission to the insurer. The encryption schemes are used to thwart and/or discourage attempts to modify or falsify the information on which insurance costs or charges are based.

The provided means for the party to review the recorded information can be completely local (i.e., installed locally on the parties personal computer or computing platform), can be entirely remotely based (e.g. installed on a remote computer or server and communicated with over a telephone or internet link) or can be distributed among a plurality of platforms. For example, a preview portion can be installed and run locally on the computing platform of the party, while a more thorough or detailed display function is provided by a remote server such as, for example, a Web page server.

Some parties may be reluctant to provide information to the insurer without first determining that the provided information will result in a significant savings in the cost of insurance. Providing the means for the party to review recorded information in two portions, the first portion on their own computer and the second portion based in the server of the insurer or a third party service provider of the insurer, allows the party to review the data in confidence, knowing that the data will not be transmitted or provided to the insurer until or unless the party decides that it is appropriate to do so. Providing some of the data reviewing functionality from a Web site of the insurer provides an added incentive to upload or transmit the recorded data to the insurer.

Figure 8:
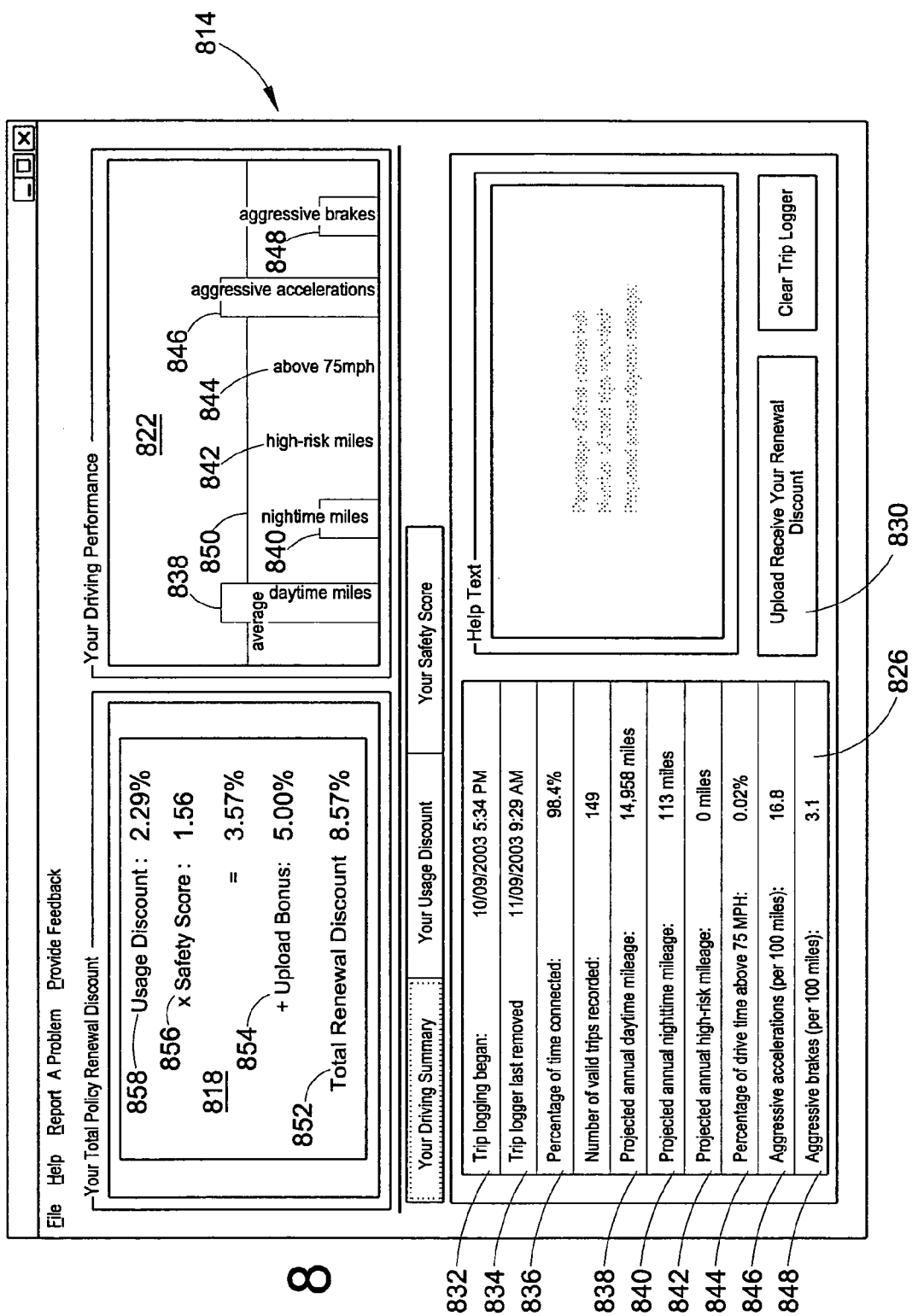
FIG. 8 is first display screen summarizing data received from a device for recording data regarding operational aspects of a motor vehicle in conjunction with information related to a cost of insurance and operational aspects of the operation of other motor vehicles.

For example, referring to FIG. 8, preview software running, for example, on a personal computer provides a driving summary display 814. The driving summary display 814 includes a policy discount section 818, a graphical operating performance section 822 and a numerical operating performance section 826. Clicking an upload button 830 would authorize the display software to transmit encrypted data from the device 300 to a computer or server of the insurer or a third party service provider thereof. For instance, the preview software would transmit the data via an internet or telephone based connection.

In the exemplary embodiment, the preview software is adapted for a system wherein the provided 722 device 300 is plugged into the machine (e.g., a vehicle) for data logging purposes and disconnected from the machine for connection to the display device and for data uploading to the insurer. Therefore the numerical performance display section 826 includes a logging start time stamp 832, a logging stop time stamp 834 and a percentage of time connected parameter 836. The start and stop time stamps 832, 834 indicate the period for which the summarized data is associated. The percentage of time connected parameter indicates how faithfully the device 300 was used during that period. For example, if the percentage of time connected 836 is relatively low, it may indicate that the device 300 was disconnected and unable to record any aspect of machine performance during periods of time when the machine was operated in an unsafe manner. A relatively high value for the percentage of time connected parameter clearly indicates that the presented data is truly representative of the monitored at least one aspect of machine performance. In some embodiments, the percentage of time connected parameter 836 may be included as a factor in determining 718 the level of willingness of the party to allow the at least one aspect of machine operation to be recorded and may thus have underwriting and rating significance. For example, a low value for the percentage of time connected parameter may indicate a low level of willingness to have the at least one aspect recorded and be associated with a higher level of risk and therefore, a reduced or eliminated discount. Of course, in embodiments where the data log comprises a removable memory or storage element, the percentage of time connected parameter 836 is in reference to the removable memory element and/or the device as a whole.

The numerical driving performance section 826 also displays summary information related to the recorded parameters received from the device 300. Where appropriate, the information is presented on an annualized basis. For instance, the logging start and stop parameters 832, 834 indicate that the summarized data was collected over a period of 31 days. The display software projects machine use or mileage estimates based on the 31 day logging period. The projections can be based simply on the ratio of recorded days versus the number of days in a year or can be more sophisticated, seasonally adjusted figures.

For instance, the preview display software projects an annual daytime mileage of 14,958 miles based on the number of miles recorded in the 31 day period. Additionally, the preview software displays a nighttime mileage projection 840 of 113 miles and a high risk mileage projection 842 of 0 miles.

Additionally, the numerical performance display 826 includes indications 844, 846, 848 that the vehicle is driven above 75 miles per hour 0.02 percent of the time, aggressively accelerated 16.8 times per 100 miles driven and was aggressively braked or decelerated 3.1 times for every 100 miles driven.

The graphical operational performance section 822 displays these same parameters 838-848 as bar charts in relation to average or nominal values 850, thereby allowing the operator to compare his or her operating habits to other machine operators or drivers.

In the exemplary embodiment, the discount section 818 of the operational summary 814 indicates that a total discount 852 is based upon a calculation including an upload bonus 854, a rating factor, such as a safety score 856 and a usage discount 858. Current customers can apply the total discount 852 to a base premium amount known to them to determine a cost of insurance. Non-customers can apply the discount to a base cost presented in an insurance quote already provided to them or will receive a cost of insurance notification after the non-customer uses the upload button 830 to transmit the recorded data from the device 300 to the insurer.

In the exemplary embodiment, an upload bonus 854 is a discount applied to determine or set 734 a cost of insurance for those determined 718 to have a level of willingness to allow one or more aspects of machine operation to be monitored associated with actually uploading, transmitting or otherwise providing recorded data to the insurer. Other (e.g., lesser) discounts may be provided or set 734 to those who are determined 718 to have a level of willingness associated with using the preview software to review their performance, but that chose not to transmit the recorded data to the insurer. A still lesser discount might be provided or set 734 for those who request and install the device 300, but do not review the data or transmit it to the insurer. Alternatively, any determined 718 level of willingness less than that associated with transmitting the data to the insurer may indicate or be assigned 726 a level of risk associated with setting 734 no discount, or even a surcharge.

The safety score 856 and usage discount 858 are explained in other screens or windows.

Figure 9:
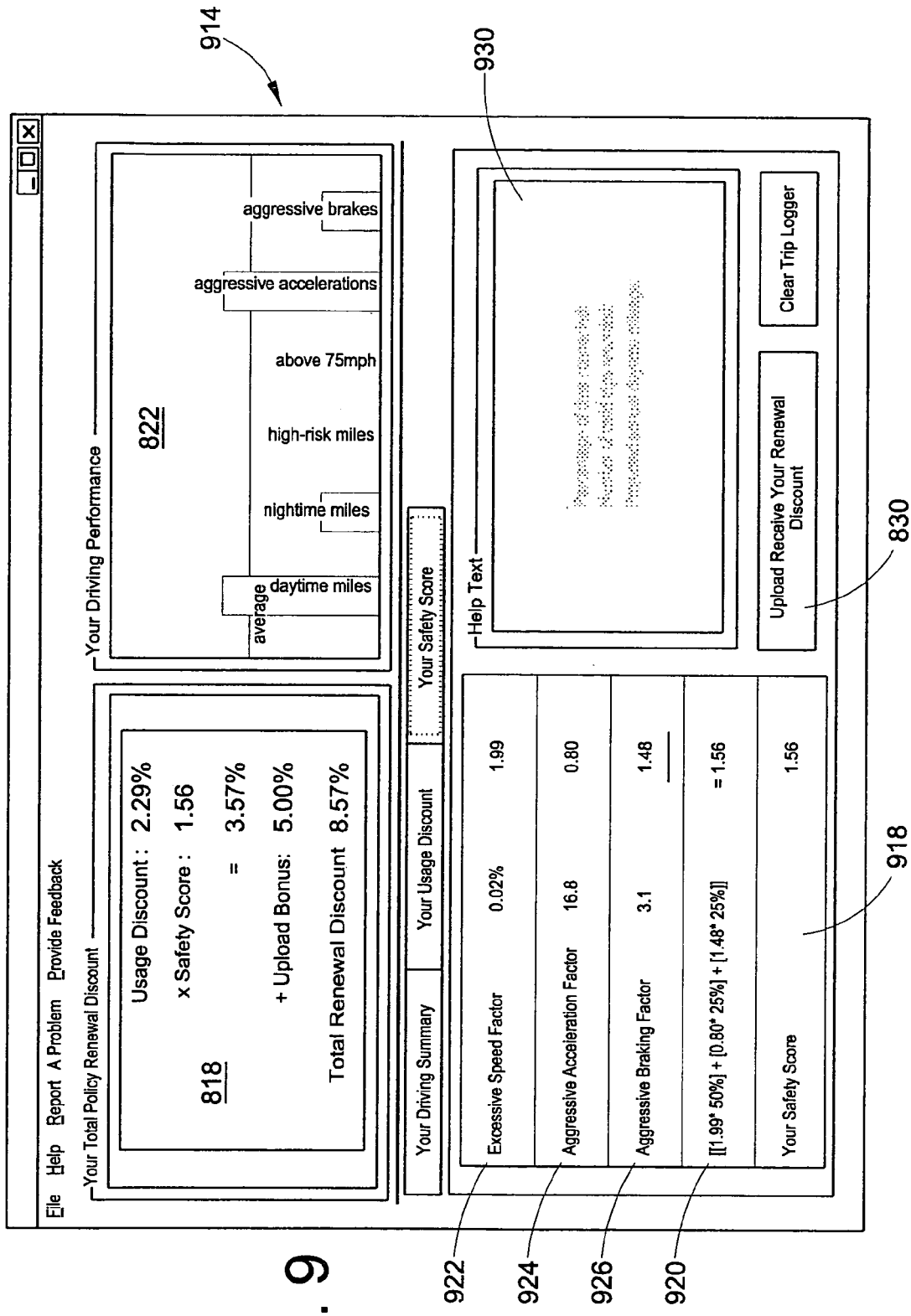
FIG. 9 is second display screen summarizing the data received from the device for recording data regarding one or more operational aspects of the motor vehicle in conjunction with information related to a cost of insurance and operational aspects of the operation of other motor vehicles.

Referring to FIG. 9, a safety score display 914 includes a safety score explanation section 918. Additionally, the safety score display 914 includes the discount summary 818 and graphical performance section 822.

The safety score explanation section 918 indicates the safety score is a function 920 of an excessive speed factor 922, an aggressive acceleration factor 924 and an excessive braking factor 926. A help window 930 may further explain, for example, that the excessive speed factor 922 starts out at a value of 2.0, but is reduced by 1 for every 1.5 percent of driving done at a speed over 75 miles per hour. The help window 930 might also explain that the aggressive braking factor 926 also starts at a value of 2 and is reduced by ⅙ times the number of observed aggressive braking events observed normalized to a per 100 miles driven basis. The help window 930 might also explain, for example, that the aggressive acceleration factor 924 starts out at a value of 2.0, and is reduced at a rate of 1/14 times the number of aggressive acceleration events recorded in the device 300 normalized to a per 100 miles driven basis.

The safety score explanation window 918 indicates that the safety score is a weighted function 920 of the factors 922, 924, 926.

Figure 10:
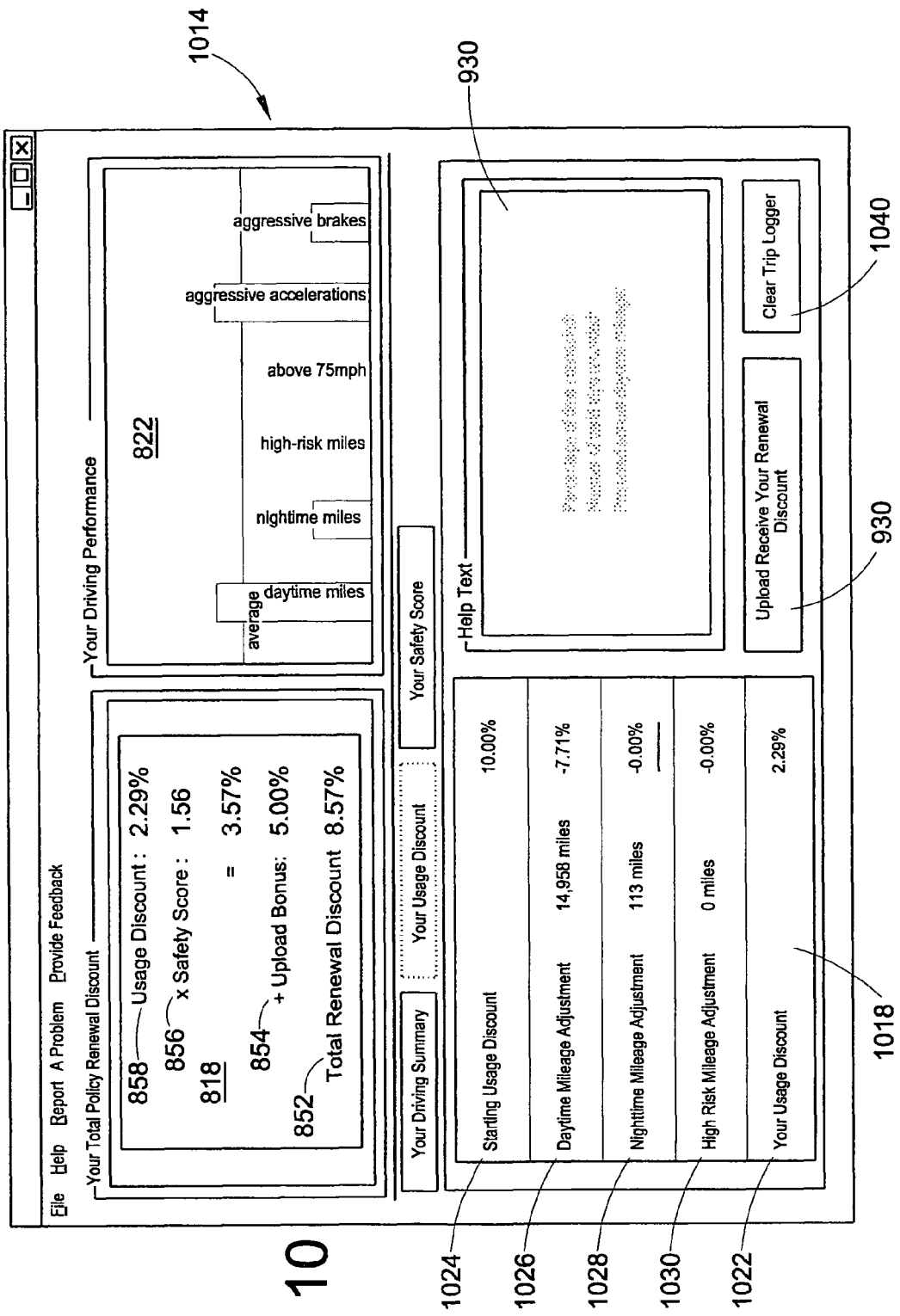
FIG. 10 is third display screen summarizing data received from the device for recording data regarding one or more operational aspects of the motor vehicle in conjunction with information related to a cost of insurance and operational aspects of the operation of other motor vehicles.

Referring to FIG. 10, in the exemplary embodiment, a usage discount display 1014 includes a usage discount detail section 1018. The usage discount display 1014 also includes the discount summary display 818 and the graphical operation performance section 822.

The usage discount detail section 1018 indicates that the usage discount 1022 is a function of a starting discount 1024, and rating factors, such as, a daytime mileage adjustment 1026, a nighttime mileage adjustment 1028 and a high risk mileage adjustment 1030.

The help window 930 might explain that the usage discount 1022 starts at the value of the starting usage discount 1024, but is reduced in value by each of the adjustment values 1026-1030. For example, the starting usage discount might be 10 percent. The usage discount 1022 is adjusted downward based on the number of annualized miles driven during the day, driven during the night and/or classified as high risk. Daytime miles might, for example, be defined as miles driven between the hours of 5 a.m. and 10 p.m. local time. Miles driven between the hours of 10 p.m. and 5 a.m. Monday-Friday might be classified as nighttime miles. Miles driven during the hours of 12 a.m. to 4 a.m. on Saturday and Sunday might be classified as high risk miles.

The help window 930 might also explain that the daytime adjustment reduces the starting usage discount value by 1 percent for every 1000 miles driven beyond 7250 miles per year. Miles driven during nighttime might reduce the usage discount by, for example, 2.5 percent for every 1000 nighttime miles driven in excess of 250. High risk miles might reduce the usage discount at a rate of 12 percent per 1000 high risk miles driven.

The discount detail section 818 makes it clear that, in the illustrated embodiment, the total discount 852 is calculated by multiplying the usage discount 858 by the safety score 856 and adding the upload bonus 854 to that product.

If the party selects or decides to provide the recorded data from the device 300 to the insurer, the party clicks the upload button 930. The preview software acts as an intermediary and transmits encrypted data from the device 300 to a server of the insurer or of a third party service party of the insurer via the internet or a telephone dial-up connection. In some embodiments the transmitted data is encrypted. Once that process is completed, the party may click on a clear logger button 1040 to direct the preview software to issue commands to erase the recorded data in the device 300, thereby freeing resources for recording information regarding the at least one aspect of machine operation in the future.

Figure 11:
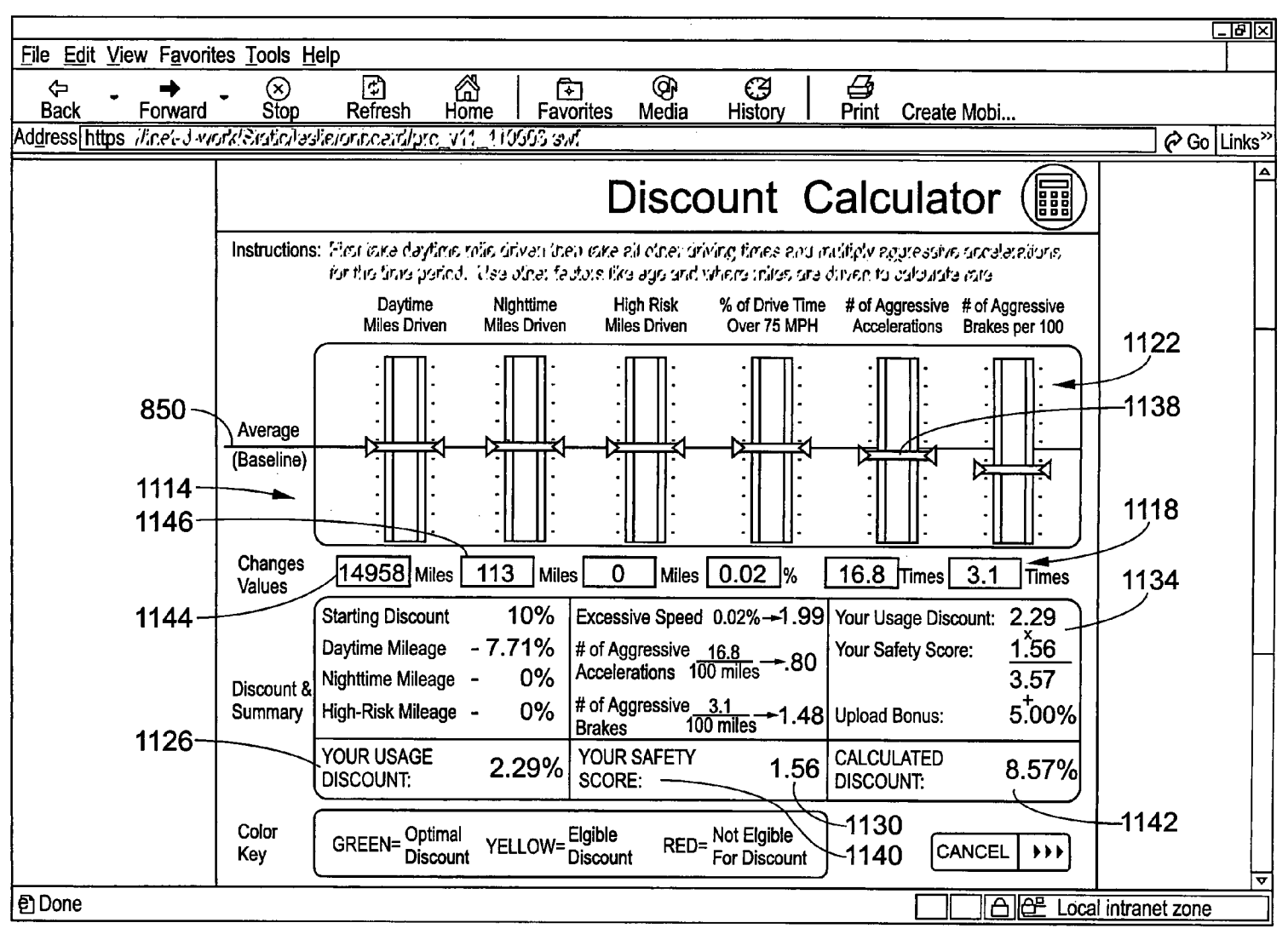

Referring to FIG. 11, in the illustrated embodiment, a portion of the provided means for the party to review recorded information regarding the at least one aspect of machine operation is provided in the form of a Web site. After the insurer or the third party service provider of the insurer receives a copy of the data that was recorded in the device 300, the party associated with the machine may further review the data through the services of the Web site. For instance, the Web site provides tools 1114 for examining how altering operational behaviors or characteristics would affect the cost of insurance (or a discount or surcharge on insurance) in the future. For example, the Web site provides text entry boxes 1118 or graphical sliders 1122 for manipulating or editing summary information describing the information received by the insurer or the third party service provider of the insurer. The party logs in or otherwise identifies or associates himself or herself with the uploaded data and summary information regarding the uploaded data is preloaded into the tools 1114, 1118, 1122. Additionally, a usage discount summary 1126, safety score summary 1130 and discount calculation 1134 portions of the Web page are preloaded with appropriate summary information. The party may then use the text windows 1118 or sliders 1120 to change the displayed performance summary information in order to determine how different machine operational behavior would have affected the cost of insurance or applicable discount or surcharge, or will affect the cost of insurance in the future.

For instance, the party may change a position of an aggressive accelerations slider 1138 and observe, for instance, how reducing the number of aggressive accelerations performed while driving the vehicle would affect both a safety score 1140 and a total discount 1142 that the insurer would have applied against a base premium of the party if the number of aggressive accelerations were reduced to the new number. Similarly, entering an increased number of daytime 1144 or nighttime 1146 miles would be reflected in the usage discount 1126 summary information and would show a resulting decrease in the total discount 1142. Various graphical display techniques can be used to highlight the significance of these displayed data manipulations. For example, the colors of the slider 1122 or entered text 1118 can be changed to indicate the level of risk or safety associated with the current displayed values.

Referring to FIG. 12, providing a means for the party to review recorded information regarding the at least one aspect of machine operation can include providing further means for the party to compare the at least one aspect of operation of the machine of the party to similar aspects of the operation of machines of other parties. For example, a comparison table 1214 may be provided comparing operational aspects 1218 of the operation of the machine of the party to an average 1222 for that operational aspect calculated from data received from a plurality of other parties.

Additionally, other services and features may be provided. For example, referring to FIG. 13, a speed distribution graph 1314 may be provided illustrating a percentage of time a vehicle is operated within particle speed ranges. Similar data could be provided for comparison purposes regarding the speed distribution of the average driver, neighboring drivers, other drivers of the same model vehicle or any other appropriate comparison. Furthermore, information can be provided regarding other operational parameters. For example, a distribution graph might be provided indicating the percentage of time a seatbelt is worn, a radio is played or a cell phone is used or the number of times turn signals are used per 100 miles.

Summary information regarding the received recorded data can be presented in other contexts that may be useful to the party or help the party modify behavior. For example, referring to FIG. 14, a distribution 1414 can be provided correlating a driving activity of the party with days of the week. Additionally, or alternatively, driving activity can be correlated with a time of the day and presented in graphical form 1418. Of course, as explained above, the data can be presented in comparison to other machine operators or drivers. For instance, if the data is presented in comparison to neighboring drivers, the party may be able to determine a time of day for driving when traffic is reduced. Driving when traffic is reduced may be associated with a reduced level of risk.

Figure 15:
FIG. 15 is a display screen associated with a Web site displaying trip log information summarizing data received from the device for recording data regarding one or more operational aspects of the motor vehicle on a day-by-day basis.

Referring to FIG. 15, the Web site providing a portion of the means for the party to review recorded information regarding the at least one aspect of machine operation can present a summary of machine operation in the form of a log.

For example, where the machine is a motor vehicle, data can be presented in the form of a trip log 1514. Ignition start and stop events or aspects of machine operation can be used to demarcate the beginning and the end of trips. The length of time and the number of miles driven for each trip or for the total number of trips on a given day can be presented to the party. Where a fuel consumption aspect is included in the recorded data, fuel economy numbers can be included in the trip log. Providing the fuel economy information in a graphical form might help a party detect the onset of a mechanical failure and allow the party to perform preventive maintenance thereby avoiding a mechanical breakdown while on the road. Basic trip log information might be helpful where the party needs to account for miles driven for work related purposes, such as, for example, when filling out expense account forms. Additionally, where insurance is provided on the basis of distances actually driven or a number of hours a machine is operated, either on a pre-paid or post-paid basis, the trip log 1514 can include a cost of insurance on a per trip basis and/or on a totalized basis and presented as a bill or debit from a pre-paid amount.

Figure 16:
FIG. 16 is a display screen associated with a Web site displaying trip log information summarizing data received from the device for recording data regarding one or more operational aspects of the motor vehicle on a trip-by-trip basis hand highlighting insurance cost or risk increasing events.

Referring to FIG. 16, log information 1614 can be presented in a form highlighting insurance cost increasing events or data, such as, aggressive braking 1618, aggressive deceleration 1622 events, number of trips, duration of trips, distance of trips and time spent above a threshold speed 1626. This may allow the party to better recognize the kinds of trips where insurance cost increasing events or aspects tend to occur, thereby allowing the party to be more mindful of their machine or motor vehicle operating behavior when in those situations in the future and thereby help the party modify those behaviors.

Referring to FIG. 17, records 1714 related to device 300 operation may be provided as well. For example, a record can be provided indicating when the device 300 was cleared 1718, when the device 300 was installed in a machine 1722, removed from the machine 1726 and when data was transferred 1730 to the provided means for the party to review the recorded information such as, for example, the preview software or the server of the insurer or the third party service provider of the insurer. This information can also include a percentage of time installed parameter (e.g., 836) referring to the device 300 and/or a removable storage element thereof.

A network connection to the insurer or a service provider of the insurer can also be a convenient way to maintain the device 300. For example, software updates may be provided for the device through the services of a Web site. If the device 300 is to be transferred between an old machine and a new machine, software included in the device may be changed to accommodate differences between the first machine and the second machine. Alternatively, device updates may be provided in the form of hardware changes (e.g., memory chips or cards) or magnetic or optical media physically delivered to the party. In yet other alternatives, updates are provided through wired telephone or wireless connections to the insurer or service provider of the insurer.

The provided means for the party to review recorded information described above is exemplary only. In some embodiments, the means for reviewing will be completely based in software run on a local computing platform. In other embodiments, the means for reviewing recorded data will be provided entirely remotely, such as, from a Web site or other communications network scenarios. In still other embodiments, no means for the party to review the recorded data are provided. Instead, the data is provided to the insurer without review.

The device 300 for recording the at least one aspect of the operation of the machine can be embodied in various combinations of hardware and software. For instance, an embodiment adapted for use in conjunction with factory machinery may be embodied almost entirely in software, included, for example, in a programmable logic controller (PLC) or supervisory computers controlling factory machinery.

An exemplary embodiment 1810 of the device 300 intended for use in conjunction with an automobile, includes a processor 1814, program storage 1818, a data log 1822, a clock 1826, an internal power source 1830, a machine interface 1834 and a display interface 1838.

The program storage 1818 can be based on any suitable program storage medium. For example, read only memory (ROM), Electrically Erasable Read Only Memory (EEPROM), such as, for example, Flash memory or any other non-volatile storage medium can be used to embody the program storage 1818. The program storage includes instructions for controlling or directing the processor to record the at least one aspect of machine operation by receiving signals from the machine interface 1834, processing the signals, and storing information derived from the signals related to the at least one aspect in the data log 822. In some embodiments, the data is stored in the data log 1822 in conjunction with a time stamp based on time information generated by the clock 1826. The program storage 1818 may further include instructions for encrypting the data. For example, data intended for transmission to the insurer or the service provider of the insurer is encrypted before, or as it is being stored in the data log 1822. In some embodiments, a second copy of the information is stored in the data log 1822 using a second layer or technique of or for encryption. For instance, a first layer or technique is used for data intended for use by the display device and the second layer or technique is used for data intended for transmission or delivery to the insurer or the third party service provider of the insurer. In some embodiments of the device 1818, the program storage 1818 includes instructions for determining or monitoring an acceleration and deceleration rate of the vehicle. For example, information from a speed sensor is received through the machine interface 1834 and processed by the processor 1814 according to instructions in the program storage 1818. The speed information is processed once per second, a difference between consecutive speed measurements is continuously calculated. A positive difference between a current speed measurement and a previous speed measurement indicates, for example, an acceleration. A negative difference indicates a deceleration. If a value of a calculated acceleration exceeds a threshold, the processor 1814 is directed to process an aggressive acceleration event or trigger. For instance, the calculated acceleration rate is stored in the data log 1822 in association with a time stamp based on information from the clock 1826 and the current speed measurement. Similarly, when a calculated deceleration rate is beyond a threshold, the processor 814 is directed by the software stored in the program storage 1818 to process an aggressive deceleration event causing a time stamp, the current speed and the calculated deceleration rate to be recorded in the data log 1822. Alternatively, if the device 1810 or the vehicle include one or more accelerometers, the acceleration and deceleration rates might not be calculated. Instead, those measurements are received from the one or more accelerometers. Nevertheless, if an acceleration or deceleration threshold is exceeded, the processor 1814 processes an acceleration or deceleration event as described above, except that measured accelerations or decelerations are used instead of calculated accelerations and decelerations. The program storage 1818 also includes instructions for the more routine storage of information. For instance, information in the program storage 1818 directs the processor 1814 to monitor speed signals over the machine interface 1834 and to record speed information on a regular basis. For example, speed information is recorded, perhaps in conjunction with a time stamp, every 10 seconds or at a faster rate if a speed threshold is exceeded. Additionally, other information may be recorded. For instance, trip start and stop times, device 1810 installation and de-installation times, seat belt usage, turn signal usage, location or route information, entertainment system usage, cell phone usage, tire pressure, or any parameter that may be of interest and available via the machine interface.

For example, the machine interface 1834 mates with an onboard diagnostic connector, such as the connectors known in the automotive industry as OBDI, OBDII and or OBDIII connectors. Additionally, or alternatively, the machine interface 1834 includes a component to mate with industry connectors known as SAE J-1962 connectors. Furthermore, the machine interface 1834 may include electronic components for generating signals that are compatible with the networks associated with those connectors. For instance, the machine interface 1838 includes all electronic components that are compatible with the industry standard Controller Area Network (CAN) protocol or other protocols promulgated by the International Organization for Standardization (ISO).

The display interface 1838 may include one or more appropriate connector and associated electronic components for communicating with the display device, computational platform, personal computer or digital personal assistant of the party. For instance, the display device includes an RS-232 connector or USB connector and associated electronics for receiving and generating signals appropriate to one or more of those protocols. Additionally, or alternatively, one or both of the interfaces 1834, 1838 include wireless communications technology such as, for example, Bluetooth® communications circuitry. In yet another alternative, the data log 1822 comprises a removable storage element, such as, for example, a memory chip, card or stick or a rotatable media, such as, for example, a floppy disk, or recordable CD or DVD. In those cases, the display interface may be considered to comprise the removable storage element in that the removable storage element is placed in communication with the display device through, for example, a memory reader or disk drive that transfers or copies data from the removable storage element to the display device.

In some embodiments, the device 1810 receives power from the vehicle through the machine interface 1834. In those embodiments, the internal power source 1830 such as, for example, a battery or "super capacitor" is for maintaining the clock 1826 when the device 1810 is disconnected from the machine interface. Additionally, in some embodiments, the internal power source 1830 provides power to the data log 1822 for maintaining the recorded data when the device 1810 is separate from the vehicle or machine. For example, if the data log 1822 includes CMOS memory, the internal power source 1830 acts as a battery backup for retaining the data.

In some embodiments, the device 1810 may also receive power from the display interface 1838 when the device 1810 is connected to the computational platform, display, personal computer or PDA.

In some embodiments, the internal power source 1830 is not required. For instance, in some embodiments, the device 1810 includes a self setting clock that receives a standard time signal, such as those transmitted by governmental or standards organizations such as, for example, the National Institute of Standards and Technology and associated radio stations, such as WWVB.

In these embodiments, the clock is reset to the current time each time it is connected to the vehicle or to the display and receives power from them.

In other embodiments, the clock 1826 is reset when the device is connected to the computational platform or display device. For example, a Web page or other internet service provides a standard time signal that is used to update the clock 1826. In these embodiments, the internal power source 1830 is included and used to operate the clock between update events.

The invention has been described with reference to the preferred embodiments. Obviously, modifications and alterations will occur to others upon a reading and understanding of this specification. The present invention is intended to include all such modifications and alterations in so far as they come within the scope of the appended claims or equivalents thereof.

We claim:

1. A risk management system comprising:
a server receiver configured to wirelessly receive selected onboard vehicle data monitored by an in-vehicle data monitoring device within a vehicle;
a network server system coupled to the server receiver that provides an interface having functionality configured to establish relationships between the selected onboard vehicle data and levels of risk in a usage based insurance system;
a database that stores relationship data indicating the relationships established between the selected onboard vehicle data relating to one or more users and an insured's monitored vehicle data, where the relationship data identifies, for an insured or other selected users, relationships between relative levels of risk and the selected onboard vehicle data; and
an interface module configured to search the database for a risk assessment of vehicle data, where the interface module is responsive to a request from a database user by using the relationship data and the selected onboard vehicle data to identify the level of risk;
where the interface module is further configured to be responsive to a request to quantify driver behavior by processing the selected onboard vehicle data to render a driver safety score, where the driver safety score is characterized as a level of risk associated with insuring a selected operator or a vehicle.

2. The risk management system of claim 1 where the selected onboard vehicle data comprises speed based data and location based data associated with the vehicle.

3. The risk management system of claim 1 where the selected onboard vehicle data comprises speed based data and time of day based data associated with the vehicle.

4. The risk management system of claim 1 where the selected onboard vehicle data comprises speed based data and the relationship data comprises an insurance rating.

5. The risk management system of claim 1 where the selected onboard vehicle data comprises speed based data captured following a trigger event and the relationship data comprises an insurance rating of an insured user or one of the other selected users that results in a prospective cost or an insurance premium based on the insurance rating.

6. The risk management system of claim 1 where the selected onboard vehicle data comprises speed based data and the relationship data comprises an insurance rating of an insured user or one of the other selected users that results in a prospective cost or an insurance premium based on the insurance rating.

7. The risk management system of claim 1 where the selected onboard vehicle data comprises speed based data captured following a trigger event that results in a surcharge or a discount for an insured user.

8. The risk management system of claim 1 where the selected onboard vehicle data comprises speed based data that results in a surcharge or a discount for an insured user.

9. The risk management system of claim 1 where the selected onboard vehicle data comprises acceleration based data or deceleration based data and location based data associated with the vehicle.

10. The risk management system of claim 1 where the selected onboard vehicle data comprises acceleration based data or deceleration based data and time of day based data associated with the vehicle.

11. The risk management system of claim 1 where the selected onboard vehicle data comprises acceleration based data or deceleration based data and the relationship data comprises an insurance rating of an insured user or one of the other selected users.

12. The risk management system of claim 1 where the selected onboard vehicle data comprises acceleration based data captured following a trigger event and the relationship data comprises an insurance rating of an insured user or one of the other selected users that results in a prospective cost or an insurance premium based on the insurance rating.

13. The risk management system of claim 1 where the selected onboard vehicle data comprises acceleration based data or deceleration based data and the relationship data comprises an insurance rating of an insured user or one of the other selected users that results in a prospective cost or an insurance premium based on the insurance rating.

14. The risk management system of claim 1 where the selected onboard vehicle data comprises acceleration based data captured following a trigger event that results in a surcharge or a discount for an insured user.

15. The risk management system of claim 1 where the selected onboard vehicle data comprises acceleration based data or deceleration based data that results in a surcharge or a discount for an insured user.

16. The risk management system of claim 1 where the selected onboard vehicle data comprises lateral acceleration based data captured following a trigger event that results in a surcharge or a discount for an insured user.

17. The risk management system of claim 1 where the selected onboard vehicle data comprises lateral acceleration based data that results in a surcharge or a discount for an insured user.

18. The risk management system of claim 1 where the selected onboard vehicle data comprises braking based data and location based data associated with the vehicle.

19. The risk management system of claim 1 where the selected onboard vehicle data comprises braking based data and time of day based data associated with the vehicle.

20. The risk management system of claim 1 where the selected onboard vehicle data comprises braking based data and the relationship data comprises an insurance rating of an insured user or one of the other selected users.

21. The risk management system of claim 1 where the selected onboard vehicle data comprises braking based data captured following a trigger event and the relationship data comprises an insurance rating of an insured user or one of the other selected users that results in a prospective cost or an insurance premium based on the insurance rating.

22. The risk management system of claim 1 where the selected onboard vehicle data comprises braking based data and the relationship data comprises an insurance rating of an insured user or one of the other selected users that results in a prospective cost or an insurance premium based on the insurance rating.

23. The risk management system of claim 1 where the selected onboard vehicle data comprises braking based data captured following a trigger event that results in a surcharge or a discount for an insured user during an insurance billing process.

24. The risk management system of claim 1 where the selected onboard vehicle data comprises braking based data that results in a surcharge or a discount for an insured user.

25. The risk management system of claim 1 where the selected onboard vehicle data comprises at least one or more of the following: speed based data, location based data, acceleration based data, braking based data, and time of day based data; and where the relationship data comprises an insurance rating of an insured user or one of the other selected users that results in a prospective cost or an insurance premium based on the insurance rating.

26. The risk management system of claim 1 where the selected onboard vehicle data comprises at least one or more of the following: speed based data, location based data, acceleration based data, braking based data, and time of day based data; and where the selected onboard vehicle data is captured following a trigger event; and where the relationship data comprises an insurance rating of a insured user or one of the other selected users that results in a prospective cost or an insurance premium based on the insurance rating.

27. The risk management system of claim 1 where the vehicle is selected from the group comprising automobiles, motorcycles, vans, motor homes, and other motor vehicles.

28. The risk management system of claim 1 further comprising a transmitter configured to encode and then transmit the risk assessment of vehicle data.

29. The risk management system of claim 1 where the server receiver is coupled to a central control center that wirelessly receives the selected onboard vehicle data automatically.

30. The risk management system of claim 1 where the server receiver is coupled to a central control center that wirelessly receives the selected on board vehicle data upon the occurrence of a trigger event automatically.

31. A risk management system comprising:
a server receiver configured to wirelessly receive selected in-vehicle data monitored by an in-vehicle data monitoring device;
a computer system coupled to the server receiver that serves an interface module that monitors a vehicle operating characteristic or a vehicle operator action of one or more vehicles or operators in which the computer system is configured to establish relationships between the vehicle operating characteristic or the vehicle operator action and levels of risk that are involved in an operation of one or more vehicles;
a database that stores relationship data representing associations between vehicle data associated with a plurality of vehicles or operators and an operator or insurer monitored vehicle data, where the relationship data quantifies, for one or more vehicles or operators, relationships between relative levels of risk in the operation of the one or more vehicles and the monitored vehicle data; and
an interface module configured to search the database for a risk assessment of the vehicle data, where the interface module is responsive to a request to quantify driver behavior by processing the monitored vehicle data to render a driver safety score, where the driver safety score is characterized as a level of risk associated with insuring a selected operator or a vehicle.

32. A risk management system comprising:
a computer system that serves an interface module that is configured to establish relationships between data that represents a vehicle operating characteristic and a vehicle operator action of one or more users and data that represents levels of risk involved in an operation of one or more vehicles;
a database that stores relationship data representing associations between vehicle data associated with a plurality of vehicles or operators and an operator or insurer monitored vehicle data, where the relationship data quantifies, for one or more vehicles or operators, relationships between relative levels of risk in the operation of the one or more vehicles and the monitored vehicle data; and
an interface module that provides functionality to search the database for a risk assessment of the vehicle data, where the interface module is responsive to a request to quantify driver behavior by processing the monitored vehicle data to render a driver safety score, where the driver safety score establishes a level of risk associated with insuring a selected user or a vehicle.

33. A risk management system comprising:
a receiver configured to wirelessly receive selected onboard vehicle data monitored by an in-vehicle data monitoring device;
a computer system in communication with the receiver that serves an interface module that is configured to establish relationships between data that represents a vehicle operating characteristic or a vehicle operator action and levels of risk that are involved in an operation of one or more vehicles;
a database that stores relationship data representing associations between vehicle data associated with a plurality of vehicles or operators and monitored vehicle data, where the relationship data quantifies, for one or more vehicles or operators, relationships between relative levels of risk in the operation of the one or more vehicles and the monitored vehicle data; and
an interface module configured to process the database for a risk assessment of vehicle data, where the interface module is responsive to a request to quantify driver behavior by processing the monitored vehicle data to generate driver safety data that characterizes the level of risk associated with insuring a selected operator or a vehicle.

34. The risk management system of claim 33 where the driver safety data comprises a driver safety score.

35. The risk management system of claim 34 where the driver safety score is processed by the computer system to generate actuarial information.

36. The risk management system of claim 34 where the driver safety score is processed by the computer system to generate or verify insurance information.

37. The risk management system of claim 34 where the driver safety score comprises a weighted sum of one or more operating factors.

38. The risk management system of claim 34 where the driver safety score is derived from the monitored data collected from the vehicle and other data independent from the monitored data.

39. The risk management system of claim 34 where the driver safety score comprises a dynamic score that reflects changes in a driving behavior.

40. The risk management system claim 34 where the driver safety score comprises a rating factor that quantifies an insurable risk.

41. The risk management system claim 34 where the driver safety score comprises a single numerical value.

42. The risk management system claim 34 where the driver safety score comprises an expression representing a level of risk associated with a particular driver.

43. The risk management system of claim 33 further comprising a computer storage media accessible to the computer system that causes a processor to modify terms of an insurance policy.

44. The risk management system of claim 33 further comprising a computer storage media accessible to the computer system that causes a processor to determine an insurance premium.

45. The risk management system of claim 33 further comprising a computer storage media accessible to the computer system that causes a processor to adjust an insurance premium.

46. The risk management system of claim 33 where the network computer system comprises a back-end processor that is remote from the vehicle that generates the data.

47. The risk management system of claim 33 where the relative levels of risk are based on comparisons of a user's vehicle operating habits to vehicle operating habits of others.

48. A risk management system comprising:
an input device configured to interface and communicate with a vehicle bus that transfers information to and from in-vehicle devices;
a first processor configured to process distance-based data repetitively from the vehicle bus through the input device;
a memory that retains the distance-based data processed from the vehicle bus at a predetermined interval, the memory retains the content when not connected to a vehicle power source;
a second processor that assigns a level of insurable risk to a vehicle or an operator based at least in part on the distance-based data written to the memory;
a network server system configured to establish relationships between tracked vehicle data and levels of risk in a usage based insurance system;
a database that stores relationship data indicating the relationships established between a plurality of vehicles or operators and monitored vehicle data, where the relationship data identifies, for one or more selected vehicles or operators, relationships between relative levels of risk and the monitored vehicle data; and
an interface module configured to search the database for a risk assessment of vehicle data, where the interface module is responsive to a request by using the relationship data and the monitored vehicle data to identify risk associated with selected vehicles or operators and render an insurance rating or a driver safety score.

49. The risk management system of claim 48 where the first processor is further configured to process vehicle data comprising speed based data and location based data associated with the vehicle.

50. The risk management system of claim 48 where the first processor is further configured to process vehicle data comprising speed based data and time of day based data associated with the vehicle.

51. The risk management system of claim 48 where the first processor is further configured to process vehicle data comprising speed based data and the relationship data comprises an insurance rating.

52. The risk management system of claim 48 where the first processor is further configured to process vehicle data comprising speed based data captured following a trigger event and the relationship data comprises an insurance rating of an insured user or one of the other selected users that results in a prospective cost or an insurance premium based on the insurance rating.

53. The risk management system of claim 48 where the first processor is further configured to process vehicle data comprising speed based data and the relationship data comprises an insurance rating of an insured user or one of the other selected users that results in a prospective cost or an insurance premium based on the insurance rating.

54. The risk management system of claim 48 where the first processor is further configured to process vehicle data comprising speed based data captured following a trigger event that results in a surcharge or a discount for an insured user.

55. The risk management system of claim 48 where the first processor is further configured to process vehicle data comprising speed based data that results in a surcharge or a discount for an insured user.

56. The risk management system of claim 48 where the first processor is further configured to process vehicle data comprising acceleration based data or deceleration based data and location based data associated with the vehicle.

57. The risk management system of claim 48 where the first processor is further configured to process vehicle data comprising acceleration based data or deceleration based data and time of day based data associated with the vehicle.

58. The risk management system of claim 48 where the first processor is further configured to process vehicle data comprising acceleration based data or deceleration based data and the relationship data comprises an insurance rating of an insured user or one of the other selected users.

59. The risk management system of claim 48 where the first processor is further configured to process vehicle data comprising acceleration based data captured following a trigger event and the relationship data comprises an insurance rating of an insured user or one of the other selected users that results in a prospective cost or an insurance premium based on the insurance rating.

60. The risk management system of claim 48 where the first processor is further configured to process vehicle data comprising acceleration based data or deceleration based data and the relationship data comprises an insurance rating of an insured user or one of the other selected users that results in a prospective cost or an insurance premium based on the insurance rating.

61. The risk management system of claim 48 where the first processor is further configured to process vehicle data comprising acceleration based data captured following a trigger event that results in a surcharge or a discount for an insured user.

62. The risk management system of claim 48 where the first processor is further configured to process vehicle data comprising acceleration based data or deceleration based data that results in a surcharge or a discount for an insured user.

63. The risk management system of claim 48 where the first processor is further configured to process vehicle data comprising lateral acceleration based data captured following a trigger event that results in a surcharge or a discount for an insured user.

64. The risk management system of claim 48 where the first processor is further configured to process vehicle data comprising lateral acceleration based data that results in a surcharge or a discount for an insured user.

65. The risk management system of claim 48 where the first processor is further configured to process vehicle data comprising braking based data and location based data associated with the vehicle.

66. The risk management system of claim 48 where the first processor is further configured to process vehicle data comprising braking based data and time of day based data associated with the vehicle.

67. The risk management system of claim 48 where the first processor is further configured to process vehicle data comprising braking based data and the relationship data comprises an insurance rating of an insured user or one of the other selected users.

68. The risk management system of claim 48 where the first processor is further configured to process vehicle data comprising braking based data captured following a trigger event and the relationship data comprises an insurance rating of an insured user or one of the other selected users that results in a prospective cost or an insurance premium based on the insurance rating.

69. The risk management system of claim 48 where the first processor is further configured to process vehicle data comprising braking based data and the relationship data comprises an insurance rating of an insured user or one of the other selected users that results in a prospective cost or an insurance premium based on the insurance rating.

70. The risk management system of claim 48 where the first processor is further configured to process vehicle data comprising braking based data captured following a trigger event that results in a surcharge or a discount for an insured user during an insurance billing process.

71. The risk management system of claim 48 where the first processor is further configured to process vehicle data comprising braking based data that results in a surcharge or a discount for an insured user.

72. The risk management system of claim 48 where the first processor is further configured to process vehicle data comprising at least one or more of the following: speed based data, location based data, acceleration based data, braking based data, and time of day based data; and where the relationship data comprises an insurance rating of an insured user or one of the other selected users that results in a prospective cost or an insurance premium based on the insurance rating.

73. The risk management system of claim 48 where the first processor is further configured to process vehicle data comprising at least one or more of the following: speed based data, location based data, acceleration based data, braking based data, and time of day based data; and where the selected onboard vehicle data is captured following a trigger event; and where the relationship data comprises an insurance rating of a insured user or one of the other selected users that results in a prospective cost or an insurance premium based on the insurance rating.

74. The risk management system of claim 48 where the vehicle is selected from the group comprising automobiles, motorcycles, vans, motor homes, and other motor vehicles.

75. The risk management system of claim 48 further comprising a transmitter configured to encode and then transmit the risk assessment of distance-based data.

76. The risk management system of claim 48 further comprising a server receiver coupled to a central control center that wirelessly receives the distance-based data automatically.

77. The risk management system of claim 76 where the server receiver is coupled to a central control center that wirelessly receives the distance-based data upon the occurrence of a trigger event automatically.

78. A risk management system comprising:

a server receiver configured to wirelessly receive onboard vehicle data monitored by an in-vehicle data monitoring device within a vehicle;

a network server system coupled to the server receiver that provides an interface having functionality configured to establish relationships between the onboard vehicle data and levels of risk in a usage based insurance system;

a database that stores relationship data indicating the relationships established between the onboard vehicle data relating to one or more users and an insured's monitored vehicle data, where the relationship data identifies, for an insured or other selected users, relationships between relative levels of risk and the onboard vehicle data; and an interface module configured to search the database for a risk assessment of vehicle data, where the interface module is configured to process the relationship data and the onboard vehicle data to identify the level of risk; and where the interface module is further configured to be responsive to a request to quantify driver behavior by processing the onboard vehicle data to render a driver safety score, where the driver safety score is characterized as a level of risk associated with insuring a selected operator or a vehicle; and where the relationship data comprises an insurance rating of an insured user or one of the other selected users that results in a prospective cost or an insurance premium based on the insurance rating.

* * * * *

UNITED STATES PATENT AND TRADEMARK OFFICE
CERTIFICATE OF CORRECTION

PATENT NO.       : 8,090,598 B2
APPLICATION NO.  : 10/764076
DATED            : January 3, 2012
INVENTOR(S)      : Bauer et al.

It is certified that error appears in the above-identified patent and that said Letters Patent is hereby corrected as shown below:

Title Pg, Item (75) Inventors:
Inventorship of this patent is changed by the deletion of "David Charles Huber, Jr. of Hudson, OH (US)", and the addition of --Byron John Olexa of Broadview Heights, OH (US)-- and --Robert John McMillan of Divide, CO (US)--.

Signed and Sealed this
Fourteenth Day of February, 2012

David J. Kappos
*Director of the United States Patent and Trademark Office*